(12) United States Patent
Kramer et al.

(10) Patent No.: US 8,076,797 B2
(45) Date of Patent: Dec. 13, 2011

(54) ENERGY TRANSFER CIRCUIT AND METHOD

(75) Inventors: Quentin Wayne Kramer, Noblesville, IN (US); Steve Tolen, Carmel, IN (US)

(73) Assignee: Indy Power Systems LLC, Indianapolis, IN (US)

( * ) Notice: Subject to any disclaimer, the term of this patent is extended or adjusted under 35 U.S.C. 154(b) by 121 days.

(21) Appl. No.: 12/466,247

(22) Filed: May 14, 2009

(65) Prior Publication Data

US 2009/0302685 A1    Dec. 10, 2009

Related U.S. Application Data

(60) Provisional application No. 61/053,369, filed on May 15, 2008.

(51) Int. Cl.
*H02J 1/00* (2006.01)
(52) U.S. Cl. ............... 307/52; 307/43; 307/44; 307/48; 307/53; 307/69; 307/72; 307/75; 307/85; 307/86; 307/87
(58) Field of Classification Search ............... 307/9.1, 307/10.1, 43–44, 48, 52–53, 69, 72, 75, 85–87
See application file for complete search history.

(56) References Cited

U.S. PATENT DOCUMENTS

| 3,463,995 A | 8/1969 | Herold |
| 4,025,860 A | 5/1977 | Shibata |
| 4,277,737 A | 7/1981 | Muller |
| 4,345,197 A | 8/1982 | Wheadon |
| 4,348,628 A | 9/1982 | Loucks |

(Continued)

FOREIGN PATENT DOCUMENTS

JP        09056007 A    2/1997

OTHER PUBLICATIONS

Cleveland, Terry; "Bi-Directional, Portable, Power-Management System for Multi-Cell, Li-Ion Battery Pack Applications"; Microchip Technology, Inc.; Battery Power Products & Technology:Solutions for OEM Design Engineers, Integrators & Specifiers of Power Management Products; vol. 11, Issue 2; www.BatteryPowerOnline.com; Mar./Apr. 2007.

*Primary Examiner* — Jared Fureman
*Assistant Examiner* — Adi Amrany
(74) *Attorney, Agent, or Firm* — Taft, Stettinius & Hollister, LLP; Anthony P. Filomena, Esq.

(57) ABSTRACT

An energy transfer circuit for connecting a load to multiple energy sources that can have different voltages. The energy transfer circuit connects the load and at least two energy sources, and has a control unit. The energy transfer circuit can transfer energy from at least one energy source to the load in response to the load's power demand; transfer energy from the load to at least one energy source in response to the load's charging current, and transfer energy between the energy sources. The energy transfer circuit also includes a first capacitor in parallel with the primary source and the load; a second capacitor in parallel with the secondary source, an inductor, a first switch between the inductor and the first capacitor, a second switch between the inductor and the second capacitor. The control unit opens and closes the first and second switches in response to the load and sources.

8 Claims, 13 Drawing Sheets

U.S. PATENT DOCUMENTS

| | | | |
|---|---|---|---|
| 4,689,531 A | 8/1987 | Bacon | |
| 4,849,682 A * | 7/1989 | Bauer et al. | 320/106 |
| 5,767,658 A | 6/1998 | Hayes | |
| 5,808,448 A | 9/1998 | Naito | |
| 5,896,022 A | 4/1999 | Jacobs | |
| 5,910,722 A | 6/1999 | Lyons | |
| 6,184,659 B1 | 2/2001 | Darmawaskita | |
| 6,229,279 B1 * | 5/2001 | Dierker | 320/104 |
| 6,232,674 B1 * | 5/2001 | Frey et al. | 307/10.1 |
| 6,320,358 B2 * | 11/2001 | Miller | 323/222 |
| 6,331,365 B1 | 12/2001 | King | |
| 6,507,506 B1 * | 1/2003 | Pinas et al. | 363/79 |
| 6,515,872 B2 | 2/2003 | Nakayama | |
| 6,577,099 B2 | 6/2003 | Kruger | |
| 6,583,602 B2 | 6/2003 | Imai | |
| 6,661,108 B1 | 12/2003 | Yamada | |
| 6,680,600 B2 | 1/2004 | Emori | |
| 6,713,988 B2 | 3/2004 | Dubac | |
| 6,866,107 B2 | 3/2005 | Heinzmann | |
| 6,879,057 B1 * | 4/2005 | Pinas et al. | 307/10.1 |
| 6,886,647 B1 | 5/2005 | Gotta | |
| 7,084,525 B2 | 8/2006 | Rajashekara | |
| 7,154,237 B2 * | 12/2006 | Welchko et al. | 318/400.27 |
| 7,193,392 B2 | 3/2007 | King | |
| 7,199,535 B2 * | 4/2007 | Welchko et al. | 318/105 |
| 7,282,814 B2 | 10/2007 | Jacobs | |
| 7,388,352 B2 * | 6/2008 | Bayne et al. | 320/138 |
| 7,579,792 B2 * | 8/2009 | Nagashima et al. | 318/105 |
| 7,595,597 B2 * | 9/2009 | King et al. | 318/139 |
| 7,800,331 B2 * | 9/2010 | Chakrabarti et al. | 318/440 |
| 2003/0209375 A1 | 11/2003 | Suzuki | |
| 2005/0035737 A1 | 2/2005 | Elder | |
| 2005/0035741 A1 | 2/2005 | Elder | |
| 2005/0082095 A1 | 4/2005 | Tamai | |
| 2005/0141154 A1 | 6/2005 | Consadori | |
| 2005/0174092 A1 | 8/2005 | Dougherty | |
| 2005/0285566 A1 | 12/2005 | Furukawa | |
| 2006/0098390 A1 | 5/2006 | Ashtiani | |
| 2006/0125319 A1 * | 6/2006 | King et al. | 307/10.1 |
| 2006/0201724 A1 | 9/2006 | Leblanc | |
| 2007/0184339 A1 | 8/2007 | Scheucher | |
| 2007/0188114 A1 | 8/2007 | Lys | |
| 2007/0219670 A1 | 9/2007 | Tanaka | |
| 2007/0247116 A1 | 10/2007 | Morita | |
| 2007/0247117 A1 | 10/2007 | Morita | |
| 2007/0272116 A1 | 11/2007 | Bartley | |
| 2007/0284159 A1 | 12/2007 | Takami | |
| 2008/0018299 A1 | 1/2008 | Renda | |
| 2008/0031019 A1 | 2/2008 | Alexander | |
| 2008/0042493 A1 | 2/2008 | Jacobs | |
| 2009/0033252 A1 * | 2/2009 | Smith et al. | 318/139 |

* cited by examiner

Switch Positions - Dual
Protected Circuit: With Diodes

| | Main Bus Function | Step 1 | | | | Step 2 | | | | Step 3 | | | | Step 4 | | | | Repeat Steps |
|---|---|---|---|---|---|---|---|---|---|---|---|---|---|---|---|---|---|---|
| | | Unit 1 (20) | Unit 2 (22) | Q1 | Q2 | L1 | Unit 1 (20) | Unit 2 (22) | Q1 | Q2 | L1 | Unit 1 (20) | Unit 2 (22) | Q1 | Q2 | L1 | Unit 1 (20) | Unit 2 (22) | Q1 | Q2 | L1 | |
| # | (Sequence #) | | | | | | | | | | | | | | | | | | | | | |
| | Load | | | | | | | | | | | | | | | | | | | | | |
| 1 | Drive with Primary (20) | Dis | N/A | OP | OP | N/A | | | | | | | | | | | | | | | | |
| 2 | Drive with Secondary (22) | N/A | Dis | OP | CL | CH | | | | | | | | | | | | | | | | 1 |
| 3 | Drive with Both Primary and Secondary (20 + 22) | Dis | Dis | OP | CL | CH | | | | | | | | | | | | | | | | 1, 2, 3 & 4 |
| | Source | | | | | | | | | | | | | | | | | | | | | |
| 4 | Charge Primary (20) | CH | N/A | OP | OP | N/A | | | | | | | | | | | | | | | | |
| 5 | Charge Secondary (22) | N/A | CH | CL | OP | CH | | | | | | | | | | | | | | | | 1 |
| 6 | Charge Both Primary and Secondary (20 + 22) | CH | CH | CL | OP | CH | | | | | | | | | | | | | | | | 1, 2, 3 & 4 |
| | No Requirement (Move Energy from Unit to Unit) | | | | | | | | | | | | | | | | | | | | | |
| 7 | Primary from Secondary | N/A | Dis | OP | CL | CH | CH | N/A | OP | OP | Dis | CH | N/A | CL | OP | Dis | CH | N/A | OP | OP | Dis | 1, 2, 3 & 4 |
| 8 | Secondary from Primary | Dis | N/A | CL | OP | CH | N/A | CH | OP | OP | Dis | N/A | CH | OP | CL | Dis | N/A | CH | OP | OP | Dis | 1, 2, 3 & 4 |

Dis = Discharge, Ch = Charge, OP = Open, CL = Closed, N/A = not applicable/ not in use

Figure 8

Switch Positions - Tertiary (Page 1 of 2)
Protected Circuit: With Diodes

| # | Main Bus Function | Step 1 Unit 1 (20) | Unit 2 (22) | Unit 3 (24) | Q1 | Q2 | Q3 | Q4 | L1 | L2 | Step 2 Unit 1 (20) | Unit 2 (22) | Unit 3 (24) | Q1 | Q2 | Q3 | Q4 | L1 | L2 | Step 3 Unit 1 (20) | Unit 2 (22) | Unit 3 (24) | Q1 | Q2 | Q3 | Q4 | L1 | L2 |
|---|---|---|---|---|---|---|---|---|---|---|---|---|---|---|---|---|---|---|---|---|---|---|---|---|---|---|---|---|
| | Load | | | | | | | | | | | | | | | | | | | | | | | | | | | |
| 1 | Drive with Primary (20) | Dis | N/A | N/A | OP | OP | OP | OP | N/A | N/A | | | | | | | | | | | | | | | | | | |
| 2 | Drive with Secondary (22) | N/A | Dis | N/A | OP | CL | OP | OP | CH | N/A | | | | | | | | | | | | | | | | | | |
| 3 | Drive with Both Primary and Secondary (20 + 22) | Dis | Dis | N/A | CL | OP | OP | OP | CH | N/A | Dis | N/A | N/A | OP | OP | OP | OP | Dis | N/A | Dis | N/A | N/A | OP | OP | OP | OP | Dis | N/A |
| 4 | Drive with Tertiary (24) | N/A | N/A | Dis | OP | OP | OP | CL | N/A | CH | N/A | N/A | N/A | OP | OP | OP | OP | N/A | Dis | N/A | N/A | N/A | OP | OP | CL | OP | N/A | Dis |
| 5 | Drive with Primary and Tertiary (20÷24) | Dis | N/A | Dis | OP | OP | OP | CL | N/A | CH | Dis | N/A | N/A | OP | OP | OP | OP | Dis | Dis | Dis | N/A | N/A | OP | CL | OP | OP | Dis | Dis |
| 6 | Drive with Secondary and Tertiary (22÷24) | N/A | Dis | Dis | OP | CL | OP | CL | CH | CH | N/A | CH | CH | OP | OP | OP | OP | Dis | Dis | N/A | N/A | N/A | CL | OP | CL | OP | Dis | Dis |
| 7 | Drive with Primary, Secondary and Tertiary (20÷22÷24) | Dis | Dis | Dis | OP | CL | OP | CL | CH | CH | Dis | CH | CH | OP | OP | OP | OP | Dis | Dis | Dis | N/A | N/A | CL | OP | CL | OP | Dis | Dis |
| | Source | | | | | | | | | | | | | | | | | | | | | | | | | | | |
| 8 | Charge Primary (20) | CH | N/A | N/A | OP | OP | OP | OP | N/A | N/A | N/A | N/A | N/A | OP | OP | OP | OP | Dis | N/A | N/A | N/A | N/A | OP | CL | OP | OP | Dis | N/A |
| 9 | Charge Secondary (22) | N/A | CH | N/A | CL | OP | OP | OP | N/A | N/A | N/A | CH | N/A | OP | OP | OP | OP | N/A | Dis | N/A | N/A | N/A | OP | OP | CL | OP | N/A | Dis |
| 10 | Charge Both Primary and Secondary (20 + 22) | CH | CH | N/A | CL | OP | OP | OP | CH | N/A | CH | N/A | N/A | OP | OP | OP | OP | Dis | N/A | CH | N/A | N/A | OP | OP | OP | OP | Dis | N/A |
| 11 | Charge Tertiary (24) | N/A | N/A | CH | OP | OP | CL | OP | N/A | CH | N/A | N/A | CH | OP | OP | OP | OP | N/A | Dis | N/A | N/A | CH | OP | OP | CL | OP | N/A | Dis |
| 12 | Charge Primary and Tertiary (20÷24) | CH | N/A | CH | OP | OP | CL | OP | CH | CH | CH | N/A | CH | OP | OP | OP | OP | Dis | Dis | CH | N/A | CH | OP | OP | CL | OP | Dis | Dis |
| 13 | Charge Secondary and Tertiary (22÷24) | N/A | CH | CH | CL | OP | CL | OP | CH | CH | N/A | CH | CH | OP | OP | OP | OP | Dis | Dis | N/A | CH | CH | OP | CL | OP | OP | Dis | Dis |
| 14 | Charge Primary, Secondary and Tertiary (20÷22÷24) | CH | CH | CH | CL | OP | CL | OP | CH | CH | CH | CH | CH | OP | OP | OP | OP | Dis | Dis | CH | CH | CH | OP | CL | OP | OP | Dis | Dis |
| | No Requirement Move Energy from Unit to Unit | | | | | | | | | | | | | | | | | | | | | | | | | | | |
| 15 | Primary to Secondary (20>22) | Dis | CH | N/A | CL | OP | OP | OP | N/A | N/A | Dis | CH | N/A | OP | OP | OP | OP | Dis | N/A | Dis | N/A | N/A | OP | CL | OP | OP | Dis | N/A |
| 16 | Secondary to Primary (22>20) | CH | Dis | N/A | CL | OP | OP | OP | N/A | N/A | CH | Dis | N/A | OP | OP | OP | OP | Dis | N/A | N/A | N/A | N/A | CL | OP | OP | OP | Dis | N/A |
| 17 | Primary to Tertiary (20>24) | Dis | N/A | CH | OP | CL | CL | OP | N/A | N/A | Dis | N/A | CH | OP | OP | OP | OP | Dis | Dis | Dis | N/A | CH | OP | OP | OP | CL | N/A | Dis |
| 18 | Secondary to Tertiary (22>24) | N/A | Dis | CH | OP | CL | OP | CL | N/A | N/A | N/A | Dis | CH | OP | OP | CL | OP | Dis | Dis | N/A | CH | CH | OP | OP | CL | OP | Dis | Dis |
| 19 | Tertiary to Primary (24>20) | CH | N/A | Dis | OP | OP | CL | OP | N/A | N/A | CH | N/A | Dis | OP | OP | OP | OP | N/A | Dis | CH | N/A | N/A | OP | OP | CL | OP | N/A | Dis |
| 20 | Tertiary to Secondary (24>22) | N/A | CH | Dis | OP | OP | OP | CL | N/A | N/A | N/A | CH | Dis | OP | CL | OP | OP | N/A | Dis | N/A | CH | N/A | OP | OP | CL | OP | N/A | Dis |

Dis = Discharge,  Ch = Charge,  OP = Open,  CL = Closed,  N/A = not applicable/ not in use

Figure 13A

Switch Positions - Tertiary (Page 2 of 2)
Protected Circuit: With Diodes

| # | (Sequence #) Main Bus Function | Step 4 Unit 1 (20) | Unit 2 (22) | Unit 3 (24) | Q1 | Q2 | Q3 | Q4 | L1 | L2 | Step 5 Unit 1 (20) | Unit 2 (22) | Unit 3 (24) | Q1 | Q2 | Q3 | Q4 | L1 | L2 | Step 6 Unit 1 (20) | Unit 2 (22) | Unit 3 (24) | Q1 | Q2 | Q3 | Q4 | L1 | L2 | Repeat Steps: |
|---|---|---|---|---|---|---|---|---|---|---|---|---|---|---|---|---|---|---|---|---|---|---|---|---|---|---|---|---|---|
| Load | | | | | | | | | | | | | | | | | | | | | | | | | | | | | |
| 1 | Drive with Primary (20) | N/A | N/A | N/A | OP | OP | OP | OP | Dis | N/A | | | | | | | | | | | | | | | | | | | 1 |
| 2 | Drive with Secondary (22) | Dis | N/A | N/A | OP | OP | OP | OP | Dis | N/A | | | | | | | | | | | | | | | | | | | 1,2,3&4 |
| 3 | Drive with Both Primary and Secondary (20 + 22) | Dis | N/A | N/A | OP | OP | OP | OP | Dis | N/A | | | | | | | | | | | | | | | | | | | 1,2,3&4 |
| 4 | Drive with Tertiary (24) | N/A | N/A | N/A | OP | OP | OP | OP | N/A | Dis | | | | | | | | | | | | | | | | | | | 1,2,3&4 |
| 5 | Drive with Primary and Tertiary (20+24) | Dis | N/A | N/A | OP | OP | OP | OP | N/A | Dis | | | | | | | | | | | | | | | | | | | 1,2,3&4 |
| 6 | Drive with Secondary and Tertiary (22+24) | N/A | N/A | N/A | OP | OP | OP | OP | Dis | Dis | | | | | | | | | | | | | | | | | | | 1,2,3&4 |
| 7 | Drive with Primary, Secondary and Tertiary (20+22+24) | Dis | N/A | N/A | OP | OP | OP | OP | Dis | Dis | | | | | | | | | | | | | | | | | | | 1,2,3&4 |
| Source | | | | | | | | | | | | | | | | | | | | | | | | | | | | | |
| 8 | Charge Primary (20) | N/A | N/A | N/A | OP | OP | OP | OP | Dis | N/A | | | | | | | | | | | | | | | | | | | 1 |
| 9 | Charge Secondary (22) | N/A | CH | N/A | OP | OP | OP | OP | Dis | N/A | | | | | | | | | | | | | | | | | | | 1,2,3&4 |
| 10 | Charge Both Primary and Secondary (20 + 22) | CH | CH | N/A | OP | OP | OP | OP | Dis | N/A | | | | | | | | | | | | | | | | | | | 1,2,3&4 |
| 11 | Charge Tertiary (24) | N/A | N/A | CH | OP | OP | OP | OP | N/A | Dis | | | | | | | | | | | | | | | | | | | 1,2,3&4 |
| 12 | Charge Primary and Tertiary (20+24) | CH | N/A | CH | OP | OP | OP | OP | N/A | Dis | | | | | | | | | | | | | | | | | | | 1,2,3&4 |
| 13 | Charge Secondary and Tertiary (22+24) | N/A | CH | CH | OP | OP | OP | OP | Dis | Dis | | | | | | | | | | | | | | | | | | | 1,2,3&4 |
| 14 | Charge Primary, Secondary and Tertiary (20+22+24) | CH | CH | CH | OP | OP | OP | OP | Dis | Dis | | | | | | | | | | | | | | | | | | | 1,2,3&4 |
| No Requirement Move Energy from Unit to Unit | | | | | | | | | | | | | | | | | | | | | | | | | | | | | |
| 15 | Primary to Secondary (20>22) | N/A | CH | N/A | OP | OP | OP | OP | Dis | N/A | | | | | | | | | | | | | | | | | | | 1,2,3&4 |
| 16 | Secondary to Primary (22>20) | CH | N/A | N/A | OP | OP | OP | OP | Dis | N/A | | | | | | | | | | | | | | | | | | | 1,2,3&4 |
| 17 | Primary to Tertiary (20>24) | N/A | N/A | CH | OP | OP | OP | OP | N/A | Dis | | | | | | | | | | | | | | | | | | | 1,2,3&4 |
| 18 | Secondary to Tertiary (22>24) | N/A | N/A | CH | OP | CL | CL | OP | Dis | Dis | N/A | N/A | CH | OP | OP | OP | CL | N/A | Dis | N/A | N/A | CH | OP | OP | OP | OP | N/A | Dis | 1,2,3,4,5 & 6 |
| 19 | Tertiary to Primary (24>20) | CH | N/A | N/A | OP | OP | OP | OP | N/A | Dis | | | | | | | | | | | | | | | | | | | 1,2,3&4 |
| 20 | Tertiary to Secondary (24>22) | N/A | N/A | N/A | CL | CL | OP | OP | Dis | Dis | N/A | CH | N/A | OP | CL | OP | OP | Dis | N/A | N/A | CH | N/A | OP | OP | OP | OP | Dis | N/A | 1,2,3,4,5 & 6 |

Dis = Discharge,  Ch = Charge,  OP = Open,  CL = Closed,  N/A = not applicable/ not in use

Figure 13B

ENERGY TRANSFER CIRCUIT AND METHOD

This application claims priority to U.S. Provisional Patent Application Ser. No. 61/053,369, filed May 15, 2008 entitled "Bi-directional Nominal Current, Variable Power, and/or Variable Voltage, Energy Transfer Circuit," the disclosure of which is expressly incorporated herein by reference.

BACKGROUND AND SUMMARY

The present invention generally relates to an apparatus and methodology for combining multiple electrical power storage and/or generation systems, henceforth also referred to as power units, so that a desired combination of cost and effectiveness can be achieved by efficiently switching power into, out of, and/or around the power units to supply power to a load.

There is a growing need for the electrification of the transportation industry, and to supplement the electric power generation and distribution system (the electric utility grid) by storing energy at times when the grid has excess capacity, and releasing energy into the grid at times when generation and/or grid usage approaches maximum capacity. In addition, the cost and efficiency of storing and generating electrical power to run portable appliances has become increasingly important. The system disclosed herein can provide an efficient and convenient methodology to combine multiple electrical power storage and/or generation systems (power units) so that a desired combination of cost and effectiveness can be achieved by efficiently switching power into, out of, and/or around the power units.

In the transportation vehicle industry (including watercraft) where electrical power is used, there are internal combustion engine hybrids, fuel cell hybrids, and battery electric vehicles. In the portable appliance industry, manufacturers of portable media appliances such as mobile computers, telecommunication devices, and other entertainment devices are constantly searching for an optimum mix of cost and performance in their electrical power systems. As new and different power storage and generation methodologies evolve, there may be additional modes of power for these transportation vehicles and portable appliances. The system disclosed herein can assist in finding a desired mix of existing and future energy generation and/or storage units for these industries as well as other industries facing energy generation and/or storage issues.

The utility industry is constantly searching for more efficient ways to store energy in times of excess capacity and to release energy to supplement generation at times of peak demand. In the process, various additional peak time generation units are brought online and energy storage units are discharged. The system disclosed herein can assist in combining a desired mix of energy generation and/or storage units for the utility industry and to provide backup power as well as supplemental power Different power storage and power generating units have different cost and performance characteristics. These characteristics include, but are not limited to:
Financial cost: the cost per unit of energy stored or generated;
Energy density: the weight and volume of the module versus the amount of energy stored/delivered;
Energy efficiency: the rate of storage and discharge of energy, and/or the efficiency (minimal energy loss) in storage and discharge of energy;
Cycle Life: the useful life of the module (charge, discharge and/or energy generation life), and the stability of chemistry and/or structure;
Safety: the thermal stability, chemical inertness, energy and/or chemical containment in the event of breach of containment; and
Environmental operating range: the temperature, humidity, vibration, corrosive resistance, etc.

The system disclosed herein can be used in developing a combination of power generation and/or storage units that balances these characteristics while meeting desired objectives.

The energy transfer circuit can connect a load to multiple energy sources. The energy transfer circuit includes a load connection for connecting the load to the energy transfer circuit; a first source connection for connecting a first energy source having a first voltage to the energy transfer circuit; a second source connection for connecting a second energy source having a second voltage to the energy transfer circuit; and a control unit for receiving communications regarding the load, the first energy source and the second energy source. The first voltage of the first energy source can be the same as or different from the second voltage of the second energy source. The energy transfer circuit transfers energy from at least one of the first energy source and the second energy source to the load when the control unit receives a power demand from the load, transfers energy from the load to at least one of the first energy source and the second energy source when the control unit receives a charging current from the load; and transfers energy from either of the first and second energy sources to the other of the first and second energy sources when the control unit determines an energy transfer is necessary. The control unit can also respond to a highpower demand from the load, by controlling the energy transfer circuit to simultaneously transfer power from both the first and second energy sources to the load.

The energy transfer circuit can connect a load to a primary energy source having a first voltage and a secondary energy source having a second voltage. The energy transfer circuit can includes a first capacitor connected in parallel with the primary energy source and connected in parallel with the load; a second capacitor connected in parallel with the secondary energy source; an inductor; a first switch between the inductor and the first capacitor; a second switch between the inductor and the second capacitor; and a control unit receiving communications regarding the load, the primary source and the secondary source. The control unit controls the opening and closing of the first switch and the second switch in response to the communications. The energy transfer circuit enables the primary energy source and the secondary energy source to have different voltages. The energy transfer circuit also enables the load to draw power from either or both of the primary and secondary sources. The energy transfer circuit also enables the load to charge either or both of the primary and secondary sources. The energy transfer circuit also enables either of the primary and secondary sources to charge the other of the primary and secondary sources. Either of the first and second switches can be a unidirectionally protected switch.

The energy transfer circuit can also include a first diode in parallel with the first switch, where the first diode is biased to conduct current from the inductor towards the first capacitor. The energy transfer circuit can also have a second diode in parallel with the second switch, where the second diode is biased to conduct current from the inductor towards the second capacitor. The energy transfer circuit can also include a third switch between the primary energy source and the load.

The energy transfer circuit can also include a first sensor coupled to the primary energy source that transmits communications to the control unit regarding the status of the primary energy source. The energy transfer circuit can also include a second sensor coupled to the secondary energy source that transmits communications to the control unit regarding status of the secondary energy source. The control unit can also determine the state of charge of the primary and secondary energy sources, and can control the transfer of energy between the primary and secondary energy sources using the first and second switches.

The control unit can receive power demands from the load, and control the first and second switches to transfer energy from at least one of the primary and secondary energy sources to the load. The control unit can receive charging currents from the load, and control the first and second switches to transfer energy from the load to at least one of the primary and secondary energy sources.

A method for transferring energy to and from a load is also disclosed. The method makes use of an energy transfer circuit that includes a first capacitor, a second capacitor, an inductor, a first switch between the inductor and the first capacitor, a second switch between the inductor and the second capacitor, and a control unit. The method includes connecting the load in parallel with the first capacitor of the energy transfer circuit; connecting a primary energy source having a first voltage in parallel with the first capacitor of the energy transfer circuit; and connecting a secondary energy source having a second voltage in parallel with the second capacitor of the energy transfer circuit. The method further includes communicating status information from the primary energy source to the control unit; communicating status information from the secondary energy source to the control unit; and communicating energy requests from the load to the control unit. The method also includes controlling the opening and closing of the first switch and the second switch using the control unit; responding to charging currents from the load; responding to power demands from the load; responding to energy requests for the primary energy source and the secondary energy source; and keeping the first switch and the second switch open unless responding to the charging currents, power demands or energy requests from the load, the primary energy source or the secondary energy source.

Responding to charging currents from the load can include determining whether either of the primary or secondary energy sources has a charge priority; charging the primary energy source when the primary energy source has the highest charge priority; charging the secondary energy source when the secondary energy source has the highest charge priority; running a trickle charge routine when neither of the primary energy source or the secondary energy source has the charge priority; and discontinuing the response to the charging current from the load when the charging current ceases or after a limited time.

Charging the primary energy source can include keeping the first and second switches open to charge the primary energy source with power from the load.

The energy transfer circuit can also include a second diode connected in parallel with the second switch, where the second diode is biased to conduct current from the inductor towards the second capacitor. The charging of the secondary energy source can include closing the first switch and keeping the second switch open to charge the inductor with power from the load; then opening the first switch and discharging the inductor through the second diode to charge the secondary energy source; then repeating these steps at a desired frequency to charge the secondary energy source. Charging of the secondary energy source can also include closing the second switch after opening the first switch and discharging the inductor through the second switch to charge the secondary energy source; and then opening the second switch and continuing to discharge the inductor through the second diode to charge the secondary energy source.

Responding to power demands from the load can include determining whether the power demand is a multiple source power demand or a single source power demand; executing a highpower routine when the power demand is the multiple source power demand; and executing a single unit power routine when the power demand is the single source power demand.

Executing a highpower routine can include determining whether the primary energy source is in a primary highload operating range; determining whether the secondary energy source is in a secondary highload operating range; transferring power from both the primary and secondary energy sources to the load when the primary energy source is in the primary highload operating range and the secondary energy source is in the secondary highload operating range; monitoring the state of charge of the primary and secondary energy sources; discontinuing the highpower routine when the primary energy source goes outside the primary highload operating range; discontinuing the highpower routine when the secondary energy source goes outside the secondary highload operating range; discontinuing the highpower routine when the power demand ceases; and discontinuing the highpower routine after a limited time.

The energy transfer circuit can also include a first diode in parallel with the first switch and a second diode in parallel with the second switch, where the first diode is biased to conduct current from the inductor towards the first capacitor, and the second diode is biased to conduct current from the inductor towards the second capacitor. In this case, transferring power from both the primary and secondary energy sources to the load can include providing power to the load from the primary energy source regardless of the positions of the first and second switches; closing the second switch and keeping the first switch open to charge the inductor with power from the secondary energy source; opening the second switch and discharging the inductor through the first diode to charge the load; closing the first switch after opening the second switch and discharging the inductor through the first switch to charge the load; opening the first switch and continuing to discharge the inductor through the first diode to charge the load; and repeating these four steps at a desired frequency to charge the load.

Executing a single unit power routine can include determining an operating condition of the primary energy source; determining an operating condition of the secondary energy source; transferring power from the primary energy source to the load when the primary energy source is in as good or better operating condition than the secondary energy source; transferring power from the secondary energy source to the load when the secondary energy source is in better operating condition than the primary energy source; discontinuing the single unit power routine when the power demand ceases or after a limited time.

The energy transfer circuit can also include a first diode in parallel with the first switch and a second diode in parallel with the second switch, where the first diode is biased to conduct current from the inductor towards the first capacitor, and the second diode is biased to conduct current from the inductor towards the second capacitor. In this case, transferring power from the secondary energy source to the load can include closing the second switch and keeping the first switch open to charge the inductor with power from the secondary energy source; opening the second switch and discharging the inductor through the first diode to power the load; closing the first switch after opening the second switch and discharging the inductor through the first switch to power the load; opening the first switch and continuing to discharge the inductor through the first diode to power the load; and repeating these four steps at a desired frequency to charge the load.

It is expected that as new and better battery, energy storage, and energy generation technologies evolve, various combinations of existing and future technologies can be leveraged using the present invention.

BRIEF DESCRIPTION OF THE DRAWINGS

FIG. 8 illustrates an exemplary embodiment of the switch positions and the sequences of switch positions for various power and charge scenarios for a two power source system embodiment with a protected circuit, such as the embodiment shown in FIG. 1;

FIG. 13A illustrates an exemplary embodiment of steps 1-3 of the switch positions and the sequences of switch positions for various power and charge scenarios for a three power source system embodiment with a protected circuit, such as the embodiment shown in FIG. 2; and FIG. 13B illustrates an exemplary embodiment of steps 4-6 of the switch positions and the sequences of switch positions for various power and charge scenarios for a three power source system embodiment with a protected circuit.

DESCRIPTION OF PREFERRED EMBODIMENTS

Figure 1:
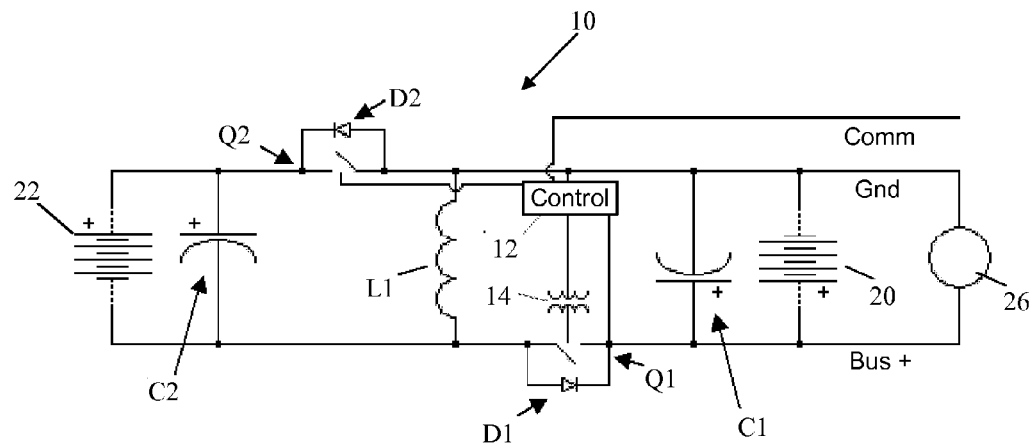
FIG. 1 is a schematic illustrating an embodiment of the present invention using two power sources.

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

An example of the value of utilizing a hybrid battery storage system would be in the design of a two power unit system for a battery electric vehicle. Depending upon the consumer's daily commute, a highway capable battery electric vehicle might require the ability to travel X miles per day on a single charge, but have the need to occasionally travel X+Y miles. The vehicle could incorporate a higher cost primary battery pack capable of daily recharging for the life of the vehicle and capable of traveling more than X miles on a single charge. The vehicle could also incorporate a lower cost secondary battery pack with a lower cycle life to be used to occasionally travel Y additional miles. A vehicle with two battery chemistries could switch charging and discharging in and out of each battery chemistry unit in a way that better balances performance and cost savings versus a single battery pack using the more expensive batteries. In addition to or in place of cost and cycle life, alternative criteria for the selection of power units could be operating temperature, weight, volume, safety, or other factors.

A battery electric vehicle could utilize Li-ion Titanate batteries as the primary source and lead-acid batteries as a secondary source. The primary source can be comprised of multiple cells and/or modules of batteries to increase range. The secondary source can also be comprised of multiple cells and/or modules so that it is capable of providing power for an extended range. The voltages of the primary and secondary power sources can be different, which is not possible in a parallel circuit. In an electric vehicle, power sources could include any combination of fuel cells, capacitors, batteries, or other sources of electrical energy.

Another power system configuration could be a design for a highway vehicle, watercraft, or home electrical power system using a combination of a photovoltaic as the primary power unit and a battery pack as a secondary power unit. Yet another combination could be a vehicle with a fuel cell as a primary power unit and a capacitor as a secondary power unit. Various combinations of different power storage and power generating units can be used as primary and secondary units in the system.

A portable electronic device, including but not limited to a sound system, could come equipped with a rechargeable Li-ion polymer battery pack (or similar power source) suitable for a couple of hours of playing time, and also include a connection allowing the consumer to add (or otherwise connect) a secondary power source, such as disposable batteries, for extended play.

A backup power supply could utilize batteries as a primary power source and photovoltaic cells as a secondary power source. Alternatively, the backup power supply could utilize two battery chemistries, or combinations of fuel cells, capacitors, batteries, or other sources of electrical energy.

The present invention allows effective and efficient flow of energy from different energy sources that may or may not have different voltages, which will allow multiple combinations of dissimilar energy sources to be combined to power a load. Examples of loads can be an electrical device such as an appliance, electric vehicle or the transfer of power to the electrical power grid. The ability to utilize dissimilar energy sources with differing voltages will allow device designers to incorporate an optimum mix of energy generation and/or energy storage for said device.

The present invention also allows for the transfer of energy from a source on the main bus to the system's power units. A transfer from a source to power units on the bus would likely be in the form of charging an energy storage device such as a battery or capacitor. The load and source can be the same unit, for example a motor with regeneration capabilities.

Various electrical energy generation and storage units possess different energy performance and cost profiles. With multiple cost and performance profiles, a trade-off between multiple combinations of power units could be made for a specific task. In addition, as new and improved energy storage and generation systems are developed, new combinations can be incorporated to perform the required task.

FIG. 1 is a schematic illustrating an embodiment of the present invention which comprises an energy transfer circuit 10 using a dual battery chemistry. The circuit includes a first switch Q1, a second switch Q2, a first capacitor C1, a second capacitor C2, an inductor L1, a control unit 12, and an isolation switch 14. In the preferred embodiment, the switches Q1 and Q2 are unidirectional protected switches; that include an insulated-gate bipolar transistor (IGBT) with a diode, D1 and D2, respectively. The use of diodes to add protection to the circuitry provides an added margin of safety, but is not required. When the switches Q1 and Q2 are unprotected, the system relies solely on proper control of the switches to maintain proper directional current flow.

A primary source 20 can be connected in parallel with the capacitor C1, and a secondary source 22 can be connected in parallel with the capacitor C2. The primary and secondary sources 20, 22 are shown to have dotted connections to represent the ability to remove either source and replace it with a new and/or different storage or power generation technology. In an alternative embodiment, a switch could be added between source 20 and the Bus to remove the primary unit from the circuit. Removal from the circuit may be desired due to a unit malfunction or for any other reason such as the desire to isolate the unit from bus current fluctuations. The capacitors C1 and C2 are included to handle the inrush or required sourced surge of current during the switching events of either Q1 or Q2 (depending on the flow of energy). A load and/or source 26 can be connected in parallel with the primary source 20. In this embodiment, an electric motor is capable of operating both as a load in propulsion mode and as a source in regeneration mode. In an alternative embodiment, a charger could be added in parallel to the load.

The control unit 12 includes a communication input that can be used to monitor power requests and demands, monitor the status of the power sources and manage recharging of the power sources. Inputs can include, but are not limited to, voltage, current, and temperature. This information can be used to determine source and load availability, calculate State of Charge (SOC) of an energy storage device, power potential of an energy device such as a fuel cell or solar panel, and to determine which operating range and/or mode of operation is to be executed. The control unit 12 controls the opening and closing of the switches Q1 and Q2 depending on the external demands from the load and/or source 26 and the status of the system 10 and the power sources 20, 22. FIG. 8 provides a table of potential switch positions appropriate for various uses of the embodiment shown in FIG. 1.

Under normal conditions, the primary source 20 powers the load 26. In this mode of operation, both switches Q1 and Q2 are open. However, when desired, the secondary source 22 can be utilized to power the load 26 or recharge the primary power source 20 by closing switch Q2 and allowing the current to rise within the inductor L1. Once the current reaches either the desired peak or saturation of the inductor L1, the switch Q2 is opened and the switch Q1 is closed allowing the current to flow into the main bus and either power the load 26 or charge the primary source 20, whichever is desired. Since the primary source 20 is not connected in parallel with the secondary source 22, the voltage of the primary source 20 does not have to be equal to the voltage of the secondary source 22. The control unit 12 can control the flow of energy as desired by the user; this is facilitated by the circuit design and the implementation of software which controls the switches Q1 and Q2 to open and close as desired.

To charge the secondary source 22 the opposite sequence of events is utilized to move energy from the main Bus. First switch Q1 is closed allowing the current flow to rise within the inductor L1. Once the current reaches either the desired peak or saturation of the inductor L1, the switch Q1 is opened and the switch Q2 is closed, allowing the current to flow from the inductor L1 into the secondary source 22 to charge the secondary source 22.

This embodiment enables power to be drawn from the two power units 20, 22 and recharging to be applied to the same two power units 20, 22. The following describes how this is done using the switch positions and sequencing for specific power transfer scenarios shown in FIG. 8.

The first switch sequence of FIG. 8 is for driving the load 26 with power from the primary source 20. As described above, this function is implemented by opening both switches Q1 and Q2. In this state, the primary source 20 provides power to the load 26.

The second switch sequence of FIG. 8 is for driving the load 26 with power from the secondary source 22. This function can be implemented using the following four step process. In Step 1, the second switch Q2 closes to charge inductor L1 to the desired level. In Step 2, the second switch Q2 opens and inductor L1 discharges to the load 26 via the first diode D1 across the first switch Q1. In Step 3, the first switch Q1 closes to facilitate discharge of inductor L1 to the load 26. In Step 4, the first switch Q1 opens as inductor L1 continues to discharge via the first diode D1. Steps 1 through 4 are repeated at a desired frequency to maintain both a stable current and comfortable sound frequency range. This sequence of switch openings/closings provides power to the load 26 from the secondary source 22.

The third switch sequence of FIG. 8 is for providing power to the load 26 from both the primary unit 20 and the secondary unit 22, referred to as high-power mode. This function can be implemented using the following four step process. In Step 1, the primary source 20 provides power to the load 26 while the second switch Q2 closes to charge inductor L1 from the secondary source 22. In Step 2, the second switch Q2 opens and inductor L1 discharges to the Bus/load 26 via the first diode D1. In Step 3, the first switch Q1 closes to facilitate discharge of inductor L1 to the Bus/load 26. In Step 4, the first switch Q1 opens as inductor L1 continues to discharge via the first diode D1. During Steps 1 though 4, the primary source 20 continues to provide power to the load 26. Steps 1 through 4 are repeated at a desired frequency to maintain both a stable current and comfortable sound frequency range. This sequence of switch openings/closings provides power to the load 26 from both the primary unit 20 and the secondary unit 22.

The fourth switch sequence of FIG. 8 is for charging the primary unit 20 with power from the source 26. For this function, both of the switches Q1 and Q2 remain open while charge is provided to the primary unit 20 from the source 26.

The fifth switch sequence of FIG. 8 is for charging the secondary unit 22 with power from the source 26. This function can be implemented using the following four step process. In Step 1, the first switch Q1 closes to charge inductor L1 to the desired level. In Step 2, the first switch Q1 opens and inductor L1 charges the secondary unit 22 via the second diode D2. In Step 3, the second switch Q2 closes to facilitate discharge of inductor L1 to charge the secondary unit 22. In Step 4, the second switch Q2 opens and inductor L1 continues to discharge via the second diode D2 across the second switch Q2 and charge the secondary unit 22. Steps 1 through 4 are repeated at a desired frequency for charging the secondary unit 22. This sequence of switch openings/closings charges the secondary unit 22 with power from the source 26.

The sixth switch sequence of FIG. 8 is for charging both the primary unit 20 and the secondary unit 22 with power from the source 26. This function can be implemented using the following four step process. In Step 1, charge is applied to the primary unit 20 as the first switch Q1 closes to charge inductor L1 to the desired level. In Step 2, the first switch Q1 opens and inductor L1 charges the secondary unit 22 via the second diode D2 while the Bus/source 26 continues to provide charge to the primary unit 20. In Step 3, the second switch Q2 closes to facilitate discharge of inductor L1 to charge the secondary unit 22. At Step 4, the second switch Q2 opens as inductor L1 continues to discharge via the second diode D2 while the secondary unit 22 continues to charge. During Steps 1 through 4, the Bus/source 26 continues to provide charge to the primary unit 20. Steps 1 through 4 are repeated at a desired frequency for the units being charged. This sequence of switch openings/closings charges both the primary unit 20 and the secondary unit 22 with power from the Bus/source 26.

The seventh switch sequence of FIG. 8 is for charging the primary unit 20 from the secondary unit 22. This function can be implemented using the following four step process. In Step 1, the second switch Q2 closes as the secondary unit 22 charges inductor L1. In Step 2, the second switch Q2 opens and inductor L1 discharges to the primary unit 20 through the first diode D1. In Step 3, the first switch Q1 closes to facilitate the discharge of inductor L1 into the primary unit 20. In Step 4, the first switch Q1 opens as inductor L1 continues to discharge to the primary unit 20 through the first diode D1. Steps 1 through 4 are repeated as long as charge is desired and at a frequency desirable for the unit. This sequence of switch openings/closings charges the primary unit 20 from the secondary unit 22.

The eighth switch sequence of FIG. 8 is for charging the secondary source 22 from the primary unit 20. This function can be implemented using the following four step process. In Step 1, the first switch Q1 closes to charge inductor L1 from the primary unit 20. In Step 2, when inductor L1 reaches a predetermined level, the first switch Q1 opens and inductor L1 discharges through the second diode D2 to charge the secondary unit 22. In Step 3, the second switch Q2 closes to facilitate the current flow to charge the secondary unit 22. In Step 4, the second switch Q2 opens and inductor L1 continues to discharge through the second diode D2 to charge the secondary unit 22. Steps 1 through 4 are repeated as long as charge is desired and at a frequency desirable for the unit. This sequence of switch openings/closings charges the secondary unit 22 from the primary unit 20.

Figure 2:
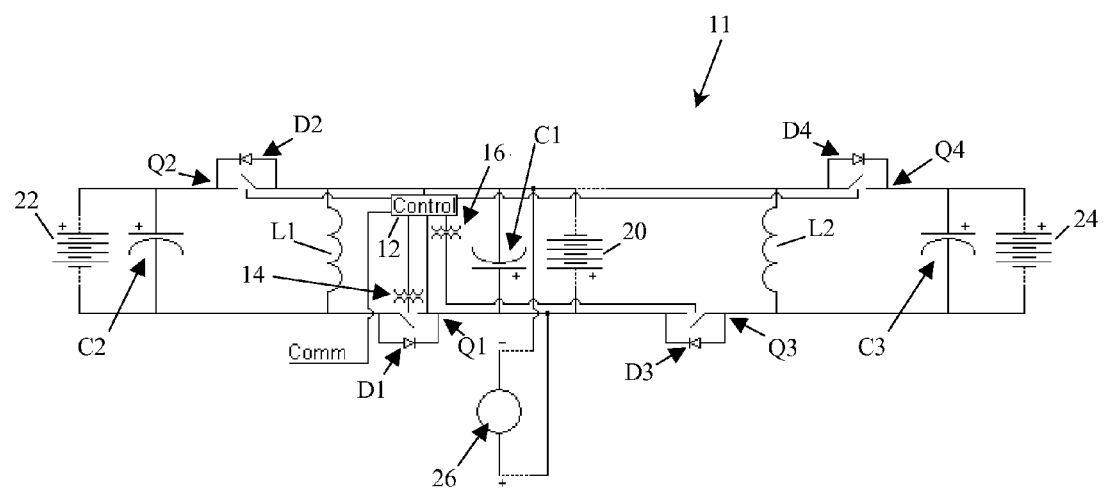
FIG. 2 is a schematic illustrating an alternative embodiment of the present invention using three power sources.

FIG. 2 is a schematic illustrating an alternative embodiment of the present invention using three power sources: a primary source 20, a secondary source 22, and a tertiary source 24, connected to a source/load 26. The same element references are used in FIG. 2 for elements corresponding to elements in FIG. 1. The embodiment of FIG. 2 comprises three capacitors C1, C2, and C3; four switches Q1, Q2, Q3 and Q4; and two inductors L1 and L2. Each of the three capacitors C1, C2, and C3 are arranged in parallel with the three power sources 20, 22 and 24, respectively. A control unit 12 controls the opening and closing of the four switches Q1, Q2, Q3 and Q4.

The embodiment illustrated in FIG. 2 enables power to be drawn from the three power units 20, 22, 24 and recharging to be applied to the same three power units 20, 22, 24. The following describes how this is done using the switch positions and sequencing for specific power transfer scenarios shown in FIGS. 13A and 13B.

The first switch sequence of FIG. 13 is for driving the load 26 with power from the primary source 20. This function is implemented by opening all four of the switches Q1, Q2, Q3 and Q4. In this state, the primary source 20 provides power to the load 26.

The second switch sequence of FIG. 13 is for driving the load 26 with power from the secondary source 22. This function can be implemented using the following four step process. In Step 1, the second switch Q2 closes to charge inductor L1 to the desired level. In Step 2, the second switch Q2 opens and inductor L1 discharges to the load 26 via the first diode D1 across the first switch Q1. In Step 3, the first switch Q1 closes to facilitate discharge of inductor L1 to the load 26. In Step 4, the first switch Q1 opens and inductor L1 continues to discharge via the first diode D1. Steps 1 through 4 are repeated at a desired frequency to maintain both a stable current and comfortable frequency range. This sequence of switch openings/closings provides power to the load 26 from the secondary source 22.

The third switch sequence of FIG. 13 is for providing power to the load 26 from both the primary source 20 and the secondary source 22. This function can be implemented using the following four step process. In Step 1, the primary source 20 provides power to the load 26 while the second switch Q2 closes to charge inductor L1 from the secondary source 22. In Step 2, the second switch Q2 opens and inductor L1 discharges to the Bus/load 26 via the first diode D1. In Step 3, the first switch Q1 closes to facilitate discharge of inductor L1 to the Bus/load 26. In Step 4, the first switch Q1 opens as inductor L1 continues to discharge via the first diode D1. During Steps 1 through 4, the primary source 20 continues to provide power to the load 26. Steps 1 through 4 are repeated at a desired frequency to maintain both a stable current and comfortable sound frequency range. This sequence of switch openings/closings provides power to the load 26 from both the primary unit 20 and the secondary unit 22.

The fourth switch sequence of FIG. 13 is for driving the load 26 with power from the tertiary source 24. This function can be implemented using the following four step process. In Step 1, the fourth switch Q4 closes to charge inductor L2 to the desired level. In Step 2, the fourth switch Q4 opens and inductor L2 discharges to the load 26 via the third diode D3 across the third switch Q3. In Step 3, the third switch Q3 closes to facilitate discharge of inductor L2 to the load 26. In Step 4, the third switch Q3 opens and inductor L2 continues to discharge via the third diode D3. Steps 1 through 4 are repeated at a desired frequency to maintain both a stable current and comfortable frequency range. This sequence of switch openings/closings provides power to the load 26 from the tertiary source 24.

The fifth switch sequence of FIG. 13 is for providing power to the load 26 from both the primary source 20 and tertiary source 24. This function can be implemented using the following four step process. In Step 1, the primary source 20 provides power to the load 26 while the fourth switch Q4 closes to charge inductor L2 from the tertiary source 24. In Step 2, the fourth switch Q4 opens and inductor L2 discharges to the Bus/load 26 via the third diode D3. In Step 3, the third switch Q3 closes to facilitate discharge of inductor L2 to the Bus/load 26. In Step 4, the third switch Q3 opens as inductor L2 continues to discharge via the third diode D3. During Steps 1 through 4, the primary source 20 continues to provide power to the Bus/load 26. Steps 1 through 4 are repeated at a desired frequency to maintain both a stable current and comfortable sound frequency range. This sequence of switch openings/closings provides power to the load 26 from both the primary unit 20 and the tertiary source 24.

The sixth switch sequence of FIG. 13 is for providing power to the load 26 from both the secondary source 22 and tertiary source 24. This function can be implemented using the following four step process. In Step 1, the second switch Q2 closes to charge inductor L1 from the secondary source 22, and the fourth switch Q4 closes to charge inductor L2 from the tertiary source 24. In Step 2, second switch Q2 opens and inductor L1 discharges to the Bus/load 26 via the first diode D1, also the fourth switch Q4 opens and inductor L2 discharges to the Bus/load 26 via the third diode D3. In Step 3, the first switch Q1 closes to facilitate discharge of inductor L1 to the Bus/load 26, and the third switch Q3 closes to facilitate discharge of inductor L2 to the Bus/load 26. In Step 4, the first switch Q1 opens as inductor L1 continues to discharge via the first diode D1, and the third switch Q3 opens as inductor L2 continues to discharge via the third diode D3. Steps 1 through 4 are repeated at a desired frequency to maintain both a stable current and comfortable sound frequency range. This sequence of switch openings/closings provides power to the load 26 from both the secondary unit 22 and the tertiary source 24.

The seventh switch sequence of FIG. 13 is for providing power to the load 26 from all three of the primary source 20, the secondary source 22 and the tertiary source 24. This function can be implemented using the following four step process. In Step 1, the primary source 20 provides power to the load 26 while the second switch Q2 closes to charge inductor L1 from the secondary source 22, and the fourth switch Q4 closes to charge inductor L2 from the tertiary source 24. In Step 2, the second switch Q2 opens and inductor L1 discharges to the Bus/load 26 via the first diode D1, also the fourth switch Q4 opens and inductor L2 discharges to the Bus/load 26 via the third diode D3. In Step 3, the first switch Q1 closes to facilitate discharge of inductor L1 to the Bus/load 26, and the third switch Q3 closes to facilitate discharge of inductor L2 to the Bus/load 26. In Step 4, the first switch Q1 opens as inductor L1 continues to discharge via the first diode D1, and the third switch Q3 opens as inductor L2 continues to discharge via the third diode D3. During Steps 1 through 4, the primary source 20 continues to provide power to the Bus/load 26. Steps 1 through 4 are repeated at a desired frequency to maintain both a stable current and comfortable sound frequency range. This sequence of switch openings/closings provides power to the load 26 from all three power sources 20, 22 and 24.

The eighth switch sequence of FIG. 13 is for charging the primary unit 20 with power from the source 26. For this function, all of the switches Q1, Q2, Q3 and Q4 remain open while charge is provided to the primary unit 20 from the source 26.

The ninth switch sequence of FIG. 13 is for charging the secondary unit 22 with power from the source 26. This function can be implemented using the following four step process. In Step 1, the first switch Q1 closes to charge inductor L1 to the desired level. In Step 2, the first switch Q1 opens and inductor L1 charges the secondary unit 22 via the second diode D2. In Step 3, the second switch Q2 closes to facilitate discharge of inductor L1 to charge the secondary unit 22. In Step 4, the second switch Q2 opens and inductor L1 continues to discharge via the second diode D2 across the second switch Q2 and charge the secondary unit 22. Steps 1 through 4 are repeated at a desired frequency for charging the secondary unit 22. This sequence of switch openings/closings charges the secondary unit 22 with power from the source 26.

The tenth switch sequence of FIG. 13 is for charging both the primary unit 20 and the secondary unit 22 with power from the source 26. This function can be implemented using the following four step process. In Step 1, charge is applied to the primary unit 20 as the first switch Q1 closes to charge inductor L1 to the desired level. In Step 2, the first switch Q1 opens and inductor L1 charges the secondary unit 22 via the second diode D2 while the Bus/source 26 continues to provide charge to the primary unit 20. In Step 3, the second switch Q2 closes to facilitate discharge of inductor L1 to charge the secondary unit 22. At Step 4, the second switch Q2 opens as inductor L1 continues to discharge via the second diode D2 and charge the secondary unit 22. During Steps 1 through 4, the Bus/source 26 continues to provide charge to the primary unit 20. Steps 1 through 4 are repeated at a desired frequency for the units being charged. This sequence of switch openings/closings charges both the primary unit 20 and the secondary unit 22 with power from the Bus/source 26.

The eleventh switch sequence of FIG. 13 is for charging the tertiary unit 24 with power from the source 26. This function can be implemented using the following four step process. In Step 1, the third switch Q3 closes to charge inductor L2 to the desired level. In Step 2, the third switch Q3 opens and inductor L2 charges the tertiary unit 24 via the fourth diode D4 across the fourth switch Q4. In Step 3, the fourth switch Q4 closes to facilitate discharge of inductor L2 to charge the tertiary unit 24. In Step 4, the fourth switch Q4 opens and inductor L2 continues to discharge via the fourth diode D4 to charge the tertiary unit 24. Steps 1 through 4 are repeated at a desired frequency for charging the tertiary unit 24. This sequence of switch openings/closings charges the tertiary unit 24 with power from the source 26.

The twelfth switch sequence of FIG. 13 is for charging both the primary unit 20 and the tertiary unit 24 with power from the source 26. This function can be implemented using the following four step process. In Step 1, charge is applied to the primary unit 20 as the third switch Q3 closes to charge inductor L2 to the desired level. In Step 2, the third switch Q3 opens and inductor L2 charges the tertiary unit 24 via the fourth diode D4, while the Bus/source 26 continues to provide charge to the primary unit 20. In Step 3, the fourth switch Q4 closes to facilitate discharge of inductor L2 to charge the tertiary unit 24. At Step 4, the fourth switch Q4 opens as inductor L2 continues to discharge via the fourth diode D4 and charge the tertiary unit 24. During Steps 1 through 4, the Bus/source 26 continues to provide charge to the primary unit 20. Steps 1 through 4 are repeated at a desired frequency for the units being charged. This sequence of switch openings/closings charges both the primary unit 20 and the tertiary unit 24 with power from the Bus/source 26.

The thirteenth switch sequence of FIG. 13 is for charging both the secondary unit 22 and the tertiary unit 24 with power from the source 26. This function can be implemented using the following four step process. In Step 1, the first switch Q1 closes to charge inductor L1 to the desired level, and the third switch Q3 closes to charge inductor L2 to the desired level. In Step 2, the first switch Q1 opens and inductor L1 charges the secondary unit 22 via the second diode D2, and also the third switch Q3 opens and inductor L2 charges the tertiary unit 24 via the fourth diode D4. In Step 3, the second switch Q2 closes to facilitate discharge of inductor L1 to charge the secondary unit 22, and the fourth switch Q4 closes to facilitate discharge of inductor L2 to charge the tertiary unit 24. At Step 4, the second switch Q2 opens as inductor L1 continues to discharge via the second diode D2 and charge the secondary unit 22, and the fourth switch Q4 opens as inductor L2 continues to discharge via the fourth diode D4 and charge the tertiary unit 24. Steps 1 through 4 are repeated at a desired frequency for the units being charged. This sequence of switch openings/closings charges both the secondary unit 22 and the tertiary unit 24 with power from the Bus/source 26.

The fourteenth switch sequence of FIG. 13 is for charging the primary unit 20, the secondary unit 22 and the tertiary unit 24 with power from the source 26. This function can be implemented using the following four step process. In Step 1, charge is applied to the primary unit 20 as the first switch Q1 closes to charge inductor L1 to the desired level, and the third switch Q3 closes to charge inductor L2 to the desired level. In Step 2, the first switch Q1 opens and inductor L1 charges the secondary unit 22 via the second diode D2, and also the third switch Q3 opens and inductor L2 charges the tertiary unit 24 via the fourth diode D4, while the Bus/source 26 continues to provide charge to the primary unit 20. In Step 3, the second switch Q2 closes to facilitate discharge of inductor L1 to charge the secondary unit 22, and the fourth switch Q4 closes to facilitate discharge of inductor L2 to charge the tertiary unit 24. At Step 4, the second switch Q2 opens as inductor L1 continues to discharge via the second diode D2 and charge the secondary unit 22, and the fourth switch Q4 opens as inductor L2 continues to discharge via the fourth diode D4 and charge the tertiary unit 24. During Steps 1 through 4, the Bus/source 26 continues to provide charge to the primary unit 20. Steps 1 through 4 are repeated at a desired frequency for the units being charged. This sequence of switch openings/closings charges the primary unit 20, the secondary unit 22 and the tertiary unit 24 with power from the Bus/source 26.

The fifteenth switch sequence of FIG. 13 is for using the primary unit 20 to charge the secondary unit 22. This function can be implemented using the following four step process. In Step 1, the first switch Q1 closes to charge inductor L1 from the primary unit 20. In Step 2, when inductor L1 reaches a predetermined level, the first switch Q1 opens and inductor L1 discharges through the second diode D2 to charge the secondary unit 22. In Step 3, the second switch Q2 closes to facilitate the current flow to charge the secondary unit 22. In Step 4, the second switch Q2 opens and inductor L1 continues to discharge through the second diode D2 to charge the secondary unit 22. Steps 1 through 4 are repeated as long as charge is desired and at a frequency desirable for the unit. This sequence of switch openings/closings charges the secondary unit 22 from the primary unit 20.

The sixteenth switch sequence of FIG. 13 is for using the secondary unit 22 to charge the primary unit 20. This function can be implemented using the following four step process. In Step 1, the second switch Q2 closes and the secondary unit 22 charges inductor L1. In Step 2, the second switch Q2 opens and inductor L1 discharges to the primary unit 20 through the first diode D1. In Step 3, the first switch Q1 closes to facilitate the discharge of inductor L1 into the primary unit 20. In Step 4, the first switch Q1 opens as inductor L1 continues to discharge to the primary unit 20 through the first diode D1. Steps 1 through 4 are repeated as long as charge is desired and at a frequency desirable for the unit. This sequence of switch openings/closings charges the primary unit 20 from the secondary unit 22.

The seventeenth switch sequence of FIG. 13 is for using the primary unit 20 to charge the tertiary unit 24. This function can be implemented using the following four step process. In Step 1, the third switch Q3 closes to charge inductor L2 from the primary unit 20. In Step 2, when inductor L2 reaches a predetermined level, the third switch Q3 opens and inductor L2 discharges through the fourth diode D4 to charge the tertiary unit 24. In Step 3, the fourth switch Q4 closes to facilitate the current flow from inductor L2 to charge the tertiary unit 24. In Step 4, the fourth switch Q4 opens and inductor L2 continues to discharge through the fourth diode D4 to charge the tertiary unit 24. Steps 1 through 4 are repeated as long as charge is desired and at a frequency desirable for the unit. This sequence of switch openings/closings charges the tertiary unit 24 from the primary unit 20.

The eighteenth switch sequence of FIG. 13 is for using the secondary unit 22 to charge the tertiary unit 24. This function can be implemented using the following six step process. In Step 1, the second switch Q2 closes and the secondary unit 22 charges inductor L1. In Step 2, the second switch Q2 opens and the third switch Q3 closes and inductor L1 discharges to the inductor L2 through the first diode D1. In Step 3, the first switch Q1 closes to facilitate the discharge of inductor L1 into inductor L2. In Step 4, the first switch Q1 opens and inductor L1 continues to discharge through the first diode D1, and also the fourth switch Q4 closes to facilitate discharge of inductor L2 into the tertiary unit 24. In Step 5, the third switch Q3 opens and inductor L2 continues to discharge to the tertiary unit 24. In Step 6, the fourth switch Q4 opens as inductor L2 continues to discharge to the tertiary unit 24 through the fourth diode D4. Steps 1 through 6 are repeated as long as charge is desired and at a frequency desirable for the units. This sequence of switch openings/closings charges the tertiary unit 24 from the secondary unit 22.

The nineteenth switch sequence of FIG. 13 is for using the tertiary unit 24 to charge the primary unit 20. This function can be implemented using the following four step process. In Step 1, the fourth switch Q4 closes and the tertiary unit 24 charges inductor L1. In Step 2, the fourth switch Q4 opens and inductor L2 discharges to the primary unit 20 through the third diode D3. In Step 3, the third switch Q3 closes to facilitate the discharge of inductor L2 into the primary unit 20. In Step 4, the third switch Q3 opens as inductor L2 continues to discharge to the primary unit 20 through the third diode D3. Steps 1 through 4 are repeated as long as charge is desired and at a frequency desirable for the unit. This sequence of switch openings/closings charges the primary unit 20 from the tertiary unit 24.

The twentieth switch sequence of FIG. 13 is for using the tertiary unit 24 to charge the secondary unit 22. This function can be implemented using the following six step process. In Step 1, the fourth switch Q4 closes and the tertiary unit 24 charges inductor L2. In Step 2, the fourth switch Q4 opens and the first switch Q1 closes and inductor L2 discharges to inductor L1 through the third diode D3. In Step 3, the third switch Q3 closes to facilitate the discharge of inductor L2 into inductor L1. In Step 4, the third switch Q3 opens and inductor L2 continues to discharge through the third diode D3, and also the second switch Q2 closes to facilitate discharge of inductor L1 into the secondary unit 22. In Step 5, the first switch Q1 opens and inductor L1 continues to discharge to the secondary unit 22. In Step 6, the second switch Q2 opens as inductor L1 continues to discharge to the secondary unit 22 through the second diode D2. Steps 1 through 6 are repeated as long as charge is desired and at a frequency desirable for the units. This sequence of switch openings/closings charges the secondary unit 22 from the tertiary unit 24.

Figure 3:
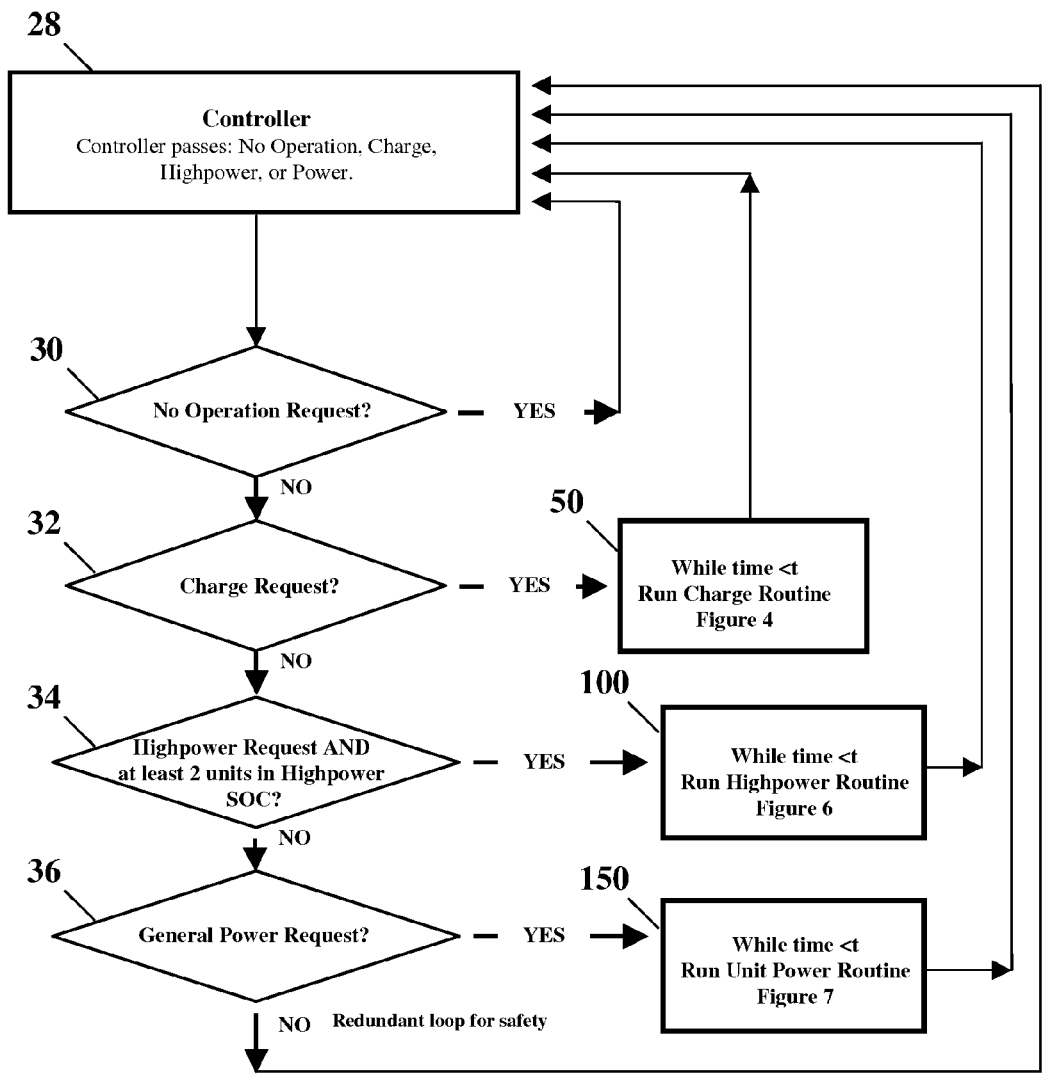
FIG. 3 illustrates an exemplary embodiment of a flow diagram for the control unit suitable for either a two power source system embodiment or a three power source system embodiment.

FIG. 3 illustrates an exemplary flow diagram for the control circuit 12 for either a two power unit system as illustrated in FIG. 1 or a three power unit system as illustrated in FIG. 2.

The control unit 12 monitors power and charge requests and directs the opening and closing of the switches of the system in accordance to the switch sequences in FIG. 8 or FIG. 13, and in accordance to a timing sequence adapted for each particular power unit or storage device used by the system. In the exemplary flow diagram illustrated in FIG. 3, the control unit 12 monitors power demands and requests; monitors the status of the available power units; and manages recharging of the available power units starting at block 28 which transfers control to block 30.

At block 30, the control unit 12 determines if there is a request for a charge or for power, or if no operation is requested. If no operation is requested control is passed back to block 28 to continue the monitoring cycle. If an operation is requested, control is passed to block 32.

At block 32, the control unit 12 checks whether there is charge request to charge the power sources 20, 22. If a charge is requested, then control is transferred to block 50 at the start of the charge routine (described below with reference to FIG. 4) for a time period t after which control is transferred back to block 28. If no charge is requested, then control is transferred to block 34.

At block 34, the control unit 12 checks if power from multiple power units is requested, a highpower request, and if at least two power units are within the state-of-charge (SOC) range required for highpower operation. If highpower is requested and at least two power units are within the SOC range required for highpower operation, then control is transferred to block 100 at the start of the highpower routine (described below with reference to FIG. 6) for a time period t after which control is transferred back to block 28. If there is not a highpower request, or there are not two power units within the SOC range required for highpower operation, control is transferred to block 36.

At block 36, the control unit 12 checks to see if there has been a power request. If there has been a power request, control is transferred to block 150 at the start of the power routine (described below with reference to FIG. 7) for a time period t after which control is transferred back to block 28. If there has not been a power request, control is transferred back to block 28.

Figure 4:
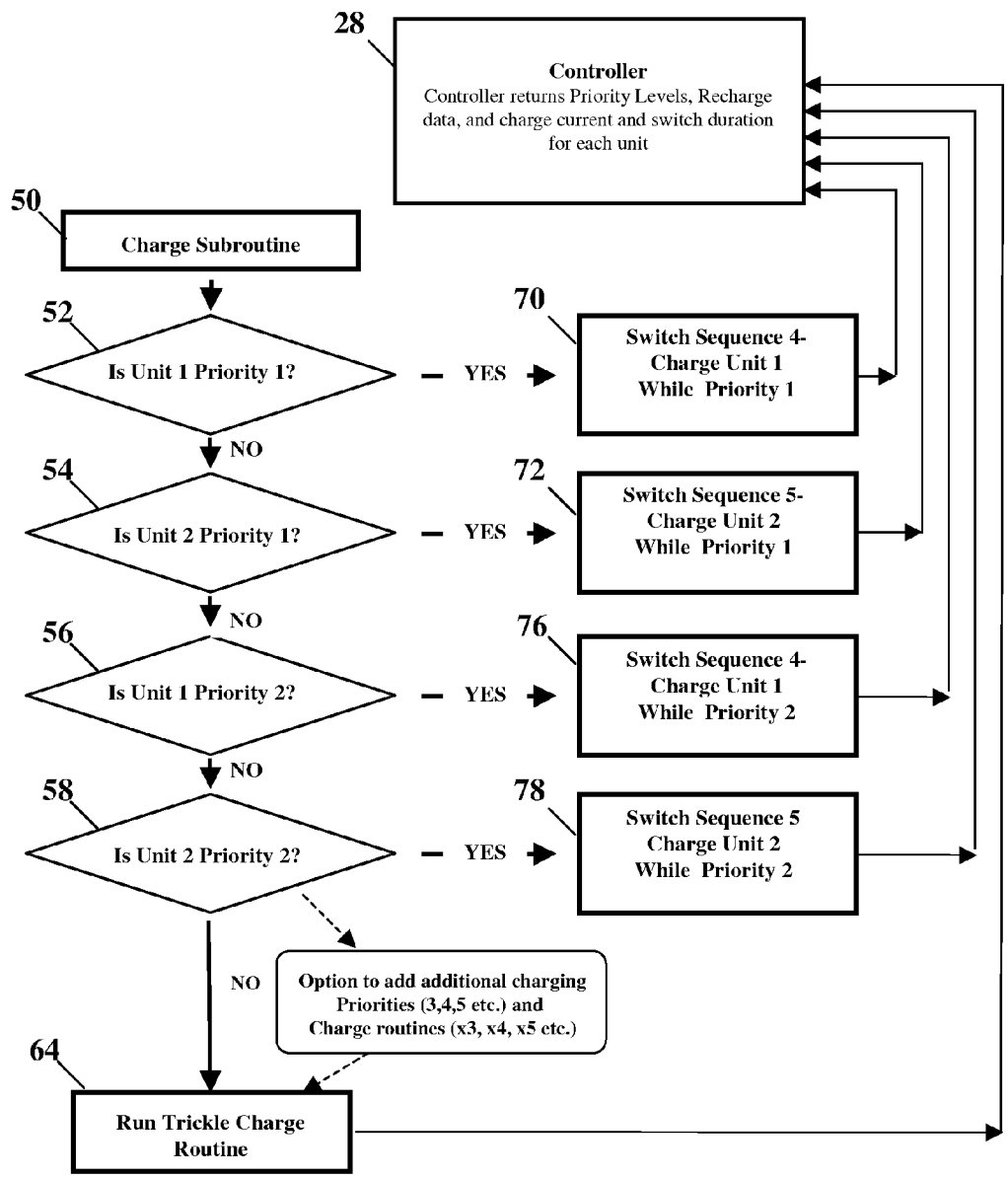
FIG. 4 illustrates an exemplary embodiment of a flow diagram for the charge routine for a two power source system embodiment.

FIG. 4 illustrates an exemplary flow diagram for the charge subroutine 50 that can be used by the control circuit 12 for a two power unit system, an embodiment of which is illustrated in FIG. 1 with an exemplary switch sequence illustrated in FIG. 8. Note that any number of priorities can be defined, based on the various power/storage unit characteristics available to the system. The charge subroutine illustrated in the exemplary flow diagram of FIG. 4 starts at block 52.

At block 52, the control unit 12 checks whether the primary power source 20 is first priority for charging. If the primary power source 20 is first priority for charging, then control is transferred to block 70 where switch sequence 4 of FIG. 8 can be used to charge the primary power source 20 while it is first priority for charging. After charging for a time period t as monitored by block 50, regardless of whether the primary power source 20 receives sufficient charging, or when the primary power source 20 is no longer first priority for charging, control is transferred back to block 28 of FIG. 3. If the primary power source 20 is not a priority for charging, control is passed to block 54.

At block 54, the control unit 12 checks whether the secondary power source 22 is first priority for charging. If the secondary power source 22 is first priority for charging, then control is transferred to block 72 where switch sequence 5 of FIG. 8 can be used to charge the secondary power source 22 while it is first priority for charging. After charging for a time period t as monitored by block 50, regardless of whether the secondary power source 22 receives sufficient charging, or when the secondary power source 22 is no longer first priority for charging, control is passed to block 28 of FIG. 3. If the secondary power source 22 is not first priority for charging, control is transferred to block 56.

At block 56, the control unit 12 checks whether the primary power source 20 is second priority for charging. If the primary power source 20 is second priority for charging, then control is transferred to block 76 where switch sequence 4 of FIG. 8 can be used to charge the primary power source 20 while it is second priority for charging. When the primary power source 20 is no longer second priority for charging, control is transferred back to block 28 of FIG. 3. After charging for a time period t as monitored by block 50, regardless of whether the primary power source 20 receives sufficient charging, control is passed to block 28 of FIG. 3. If the primary power source 20 is not second priority for charging, then control is transferred to block 58.

At block 58, the control unit 12 checks whether the secondary power source 22 is second priority for charging. If the secondary power source 22 is second priority for charging, then control is transferred to block 78 where switch sequence 5 of FIG. 8 can be used to charge the secondary power source 22 while it is second priority for charging. When the secondary power source 22 is no longer second priority for charging, control is transferred back to block 28 of FIG. 3. After charging for a time period t as monitored by block 50, regardless of whether the secondary power source 22 receives sufficient charging, control is passed to block 28 of FIG. 3. If the secondary power source is not second priority for charging, then control is transferred to block 64 where the trickle charge routine (described below with reference to FIG. 5) is executed after which control is transferred to block 28 of FIG. 3.

Additional charging priorities and charging routines can be added to the exemplary control flow diagram in FIG. 4 depending on the various power/storage unit characteristics available to the system. Also, additional power units can be added to the exemplary control flow diagram in FIG. 4 if they are available to the system.

Figure 5:
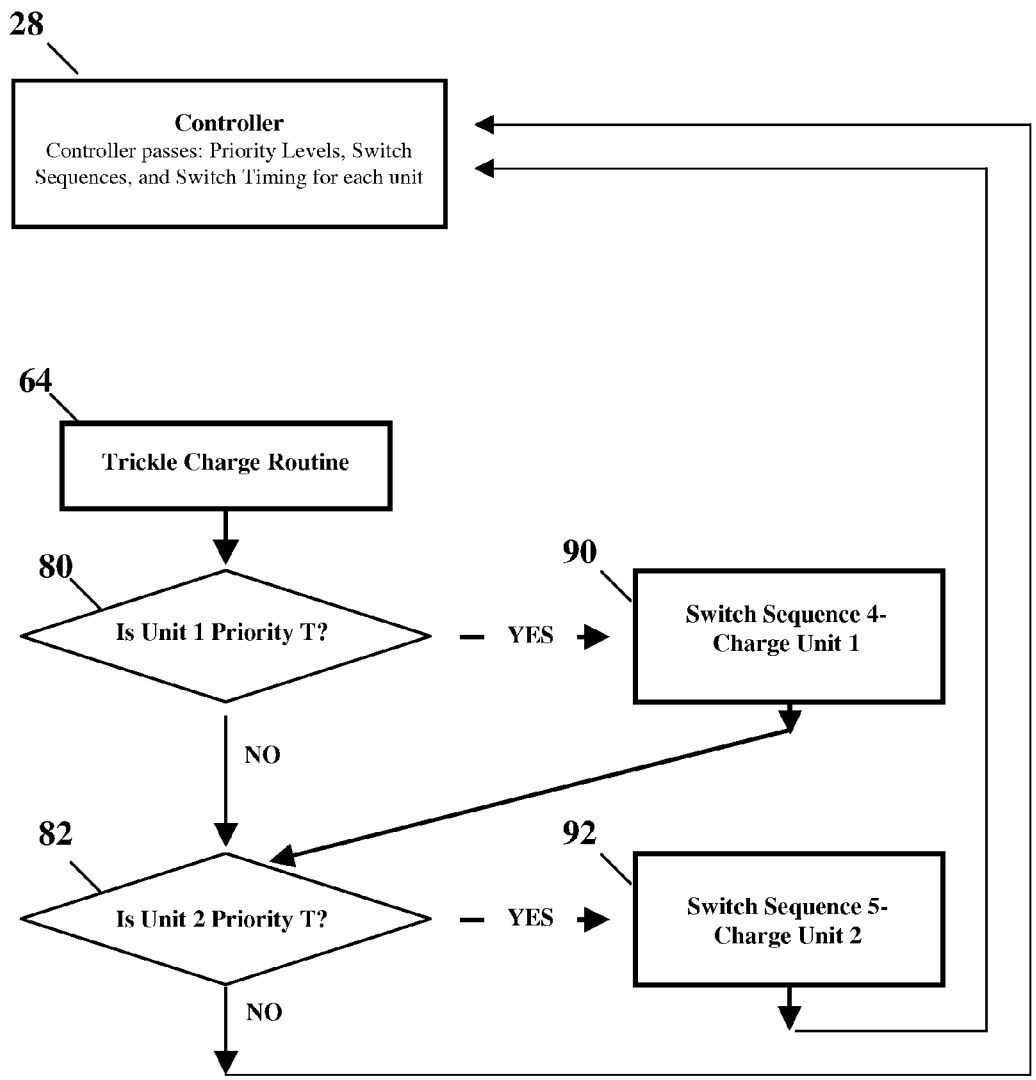
FIG. 5 illustrates an exemplary embodiment of a flow diagram for the trickle charge routine for a two power source system embodiment.

FIG. 5 illustrates an exemplary flow diagram for the trickle charge routine that can be used by the control circuit 12 for a two power unit system, such as the embodiment illustrated in FIG. 1 with an exemplary switch sequence illustrated in FIG. 8. The trickle charge routine illustrated in the exemplary flow diagram of FIG. 5 starts at block 80.

A trickle charge is the description given to the method of maintaining a charge in a rechargeable device such as a battery or capacitor. Most of these devices have a self discharge rate and must be recharged from time to time to maintain their charge. If the device is not capable of taking a charge, such as a fuel cell or photovoltaic device, the control unit would not charge that device at all. However, each rechargeable device would have a unique range of SOC near 100% determined to be optimal for long term performance, and the trickle charge would charge at a rate (including cycling on and off if desired) that would sustain the desired range for each power unit. The control unit 12 would include trickle charge routines that would alternate between switch sequence 4 and 5 in a two power source system if both power units were capable of taking a charge.

At block 80, the control unit 12 checks whether the primary power source 20 has priority T indicating trickle charge. If the primary power source 20 does not have priority T, then control is transferred to block 82. If the primary power source 20 has priority T, then control is transferred to block 90 where switch sequence 4 of FIG. 8 can be used to charge the primary power source 20 for a predetermined time t. After the predetermined time t as monitored by block 50, control is transferred from block 90 to block 82.

At block 82, the control unit 12 checks whether the secondary power source 22 has priority T indicating trickle charge. If the secondary power source 22 does not have priority T, then control is transferred to block 28 of FIG. 3. If the secondary power source 22 has priority T, then control is transferred to block 92 where switch sequence 5 of FIG. 8 can be used to charge the secondary power source 22 for a predetermined time t. After the predetermined time t as monitored by block 50, control is transferred from block 92 to block 28 of FIG. 3.

Figure 6:
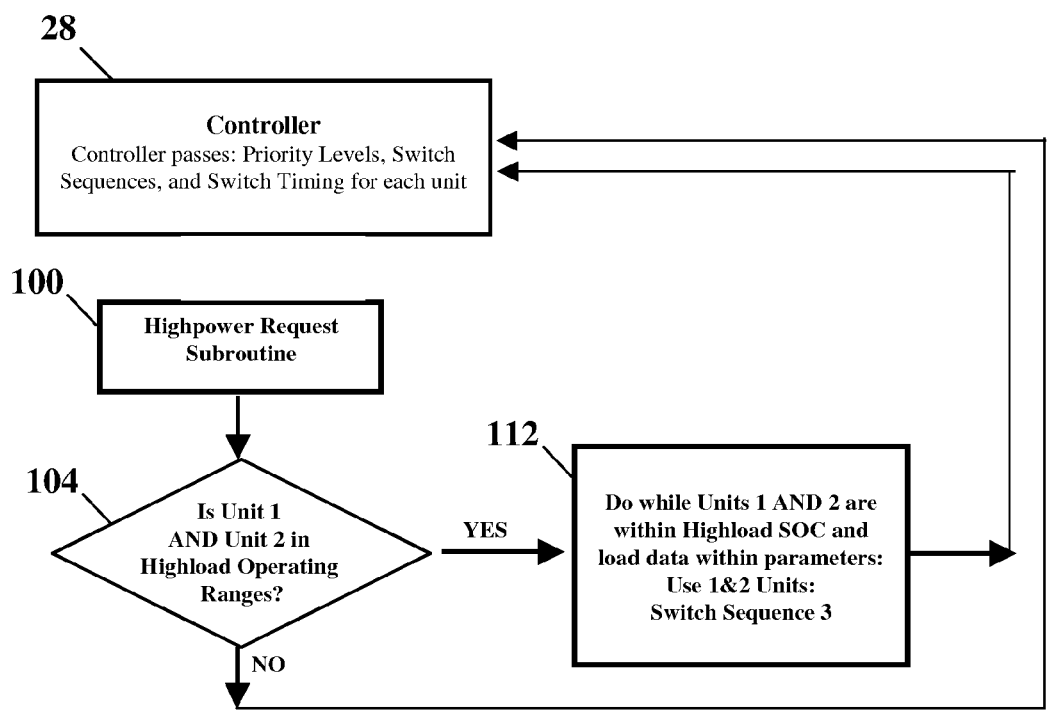
FIG. 6 illustrates an exemplary embodiment of a flow diagram for using a combination of two power units for a two power source system embodiment.

FIG. 6 shows an exemplary embodiment of a flow diagram for a highpower routine for a two power source system, such as the embodiment illustrated in FIG. 1 with an exemplary switch sequence illustrated in FIG. 8. The highpower routine of FIG. 6 starts at block 104.

The highroad operating range is a range of SOC that is determined to be sufficient to support a higher than normal power output that would likely drain power much more rapidly than might be desired for long term operation. For example, in an electric vehicle, excess power might be desired for a short duration to accelerate at a faster rate than normal for a more sporting feel. As some might consider such an excess power usage unnecessary, that excess power could be made available only if there was excess power available in the power units which would be identifiable by the highroad SOC range. If the power unit was near the lower limit of its SOC, it is unlikely that the unit would be made available for excess power.

At block 104, the control unit 12 checks whether both the primary power source 20 and the secondary power source 22 are within the highpower operating range. If both power sources 20, 22 are within the highpower operating range, control is passed to block 112. If either of power sources 20, 22 are not within the highpower operating range, control is passed to block 28 of FIG. 3.

At block 112, switch sequence 3 of FIG. 8 can be used to transfer power from both power sources 20, 22 to the load 26 while both power units 20, 22 are within the highpower SOC, and the load data is within parameters, and for up to a predetermined time t as determined by block 100. After the highpower request ends, or after the predetermined time t, or when either power source falls outside the highpower SOC, or when the load data falls outside parameters, control is passed to block 28 of FIG. 3.

In some applications, there may be power usage levels that are detrimental to the load especially over extended periods of time. When these situations are applicable, time unit t can be used to cycle off the excess power. Alternatively, one or more of the units can be marked as outside of the highpower range for a period of rest time to cycle off the excess power. Also, the excess power can be cycled off when the control unit reports a detrimental temperature or other situation outside the system's desired operating ranges.

Figure 7:
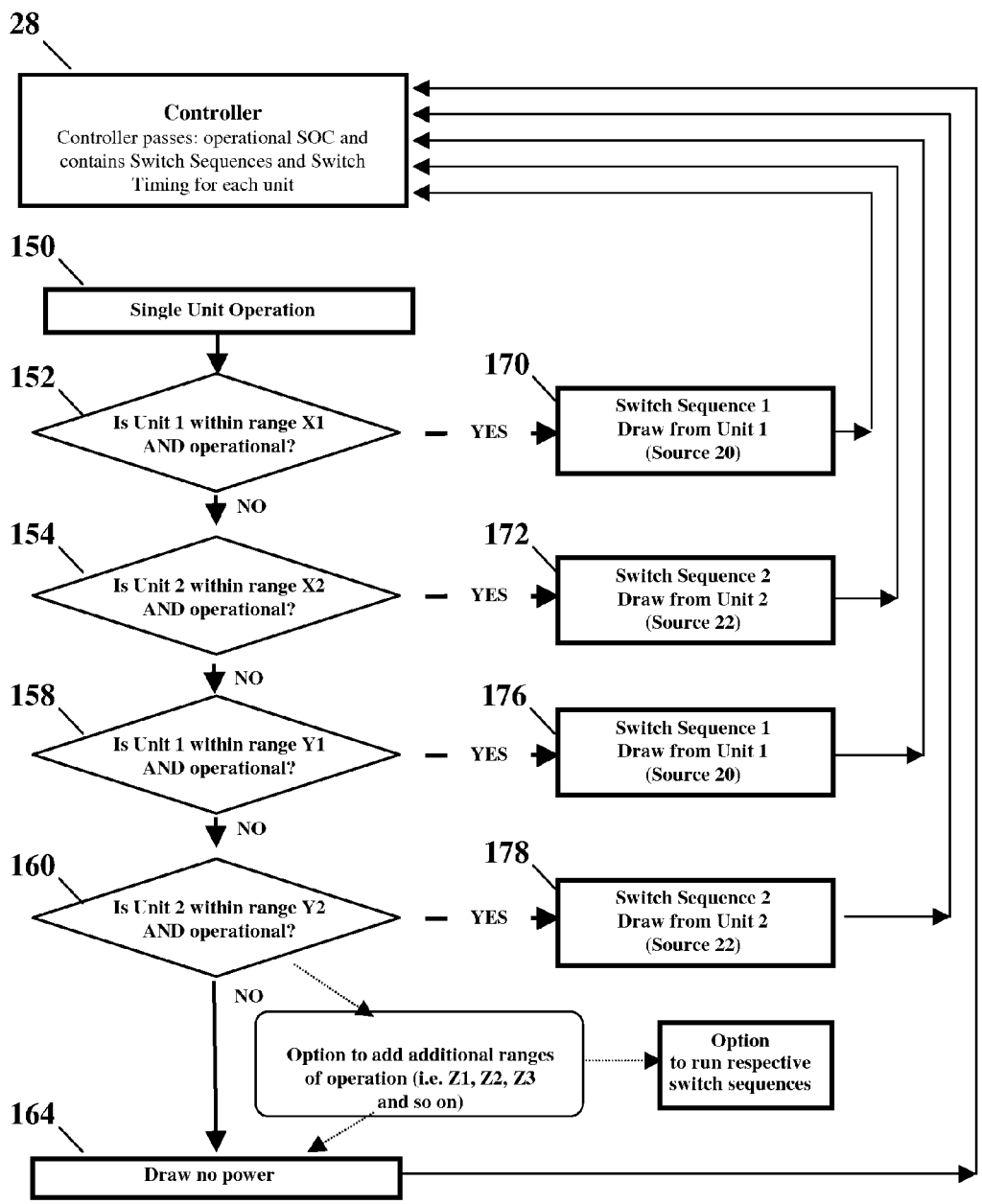
FIG. 7 illustrates an exemplary embodiment of a flow diagram for a power routine using a single power source of a two power source system embodiment.

FIG. 7 shows an exemplary embodiment of a flow diagram for the power routine 150 that can be used by the control unit 12 for a two power source system, such as the embodiment illustrated in FIG. 1 with an exemplary switch sequence illustrated in FIG. 8. The power routine is called from FIG. 3, and starts at block 152 in FIG. 7.

At block 152, the control unit 12 checks if the primary power source 20 is within range X1 and is operational. The range X1 is the desired range for the state of charge (SOC) of the primary power source 20. If the primary power source 20 is within range X1 and is operational, then control is transferred to block 170 where switch sequence 1 of FIG. 8 can be used to draw power from the primary power source 20 for time period t as determined by block 150, after which control is transferred back to block 28 of FIG. 3. If the primary power source 20 is not within range X1 or is not operational, then control is transferred to block 154.

At block 154, the control unit 12 checks if the secondary power source 22 is within range X2 and is operational. The range X2 is the desired range for the state of charge of the secondary power source 22. If the secondary power source 22 is within range X2 and is operational, then control is transferred to block 172 where switch sequence 2 of FIG. 8 can be used to draw power from the secondary power source 22 for time period t as determined by block 150, after which control is transferred back to block 28 of FIG. 3. If the secondary power source 22 is not within range X2 or is not operational, then control is transferred to block 158.

At block 158, the control unit 12 checks if the primary power source 20 is within range Y1 and is operational. The range Y1 is a broader acceptable range for the state of charge of the primary power source 20. If the primary power source 20 is within range Y1 and is operational, then control is transferred to block 176 where switch sequence 1 of FIG. 8 can be used to draw power from the primary power source 20 for time period t as determined by block 150, after which control is transferred back to block 28 of FIG. 3. If the primary power source is not within range Y1 or is not operational, then control is transferred to block 160.

At block 160, the control unit 12 checks if the secondary power source 22 is within range Y2 and is operational. The range Y2 is a broader acceptable range for the state of charge of the secondary power source 22. If the secondary power source 22 is within range Y2 and is operational, then control is transferred to block 178 where switch sequence 2 of FIG. 8 can be used to draw power from the secondary power source 22 for time period t as determined by block 150, after which control is transferred back to block 28 of FIG. 3. If the secondary power source 22 is not within range Y2 or is not operational, then control is transferred to block 164 where no power is drawn from the primary or secondary power sources 20, 22 after which control is transferred to block 28 of FIG. 3. In alternative embodiments, additional operating ranges can be inserted between block 160 and block 164 based on State of Charge (SOC), temperature, or other criteria.

Figure 9:
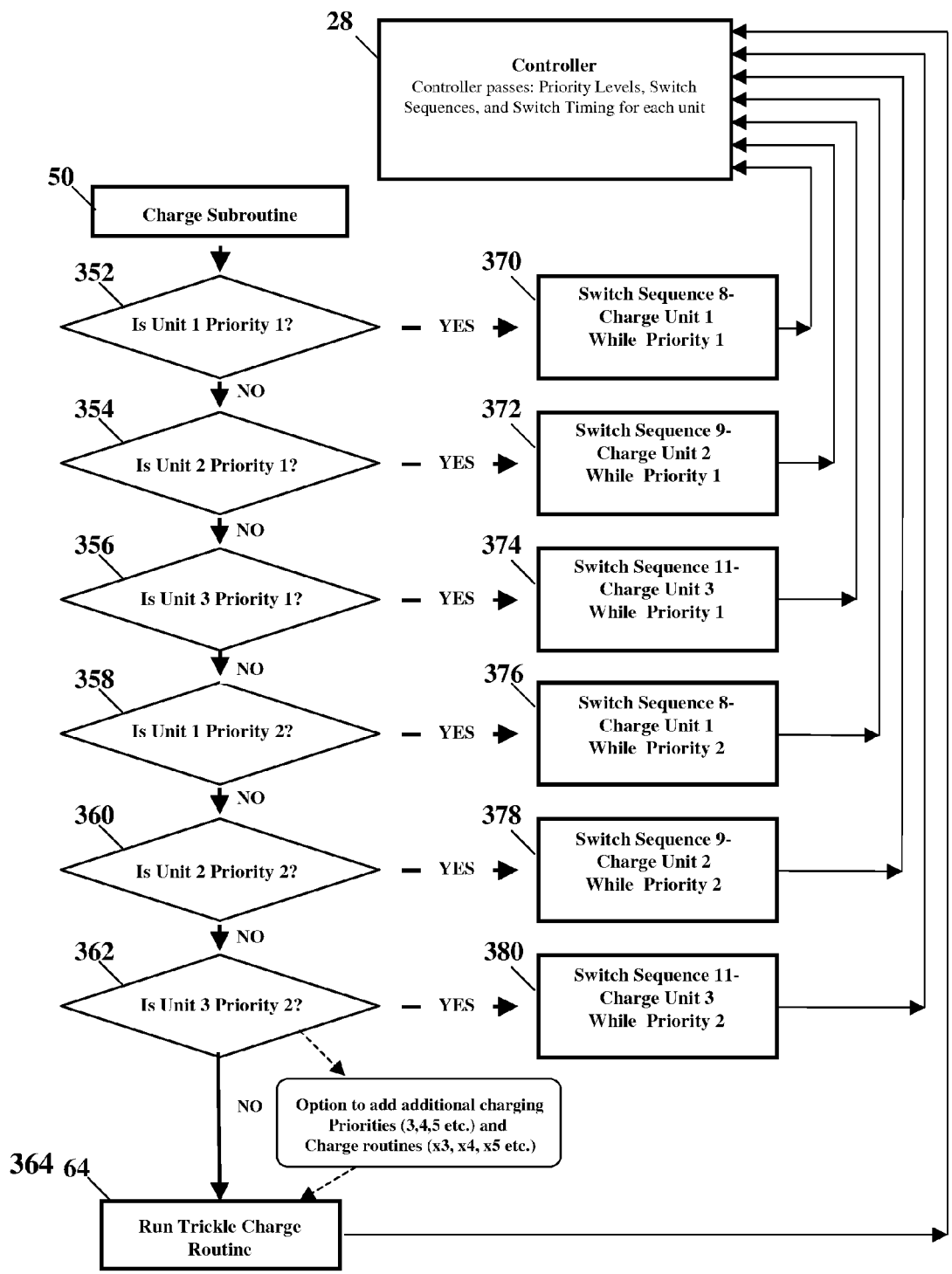
FIG. 9 illustrates an exemplary embodiment of the control method for a charge routine for a three power source system embodiment.

FIG. 9 illustrates an exemplary flow diagram for the charge subroutine 50 that can be used by the control circuit 12 for a three power unit system, such as the embodiment illustrated in FIG. 2 with an exemplary switch sequence illustrated in FIG. 13. The charge subroutine illustrated in the exemplary flow diagram of FIG. 9 starts at block 352.

At block 352, the control unit 12 checks whether the primary power source 20 is first priority for charging. If the primary power source 20 is first priority for charging, then control is transferred to block 370 where switch sequence 8 of FIG. 13 can be used to charge the primary power source 20 while it is first priority for charging. When the primary power source 20 is no longer first priority for charging, control is transferred back to block 28 of FIG. 3. After charging for a time period t as monitored by block 50, regardless of whether the primary power source 20 receives sufficient charging, control is passed to block 28 of FIG. 3. If the primary power source 20 is not first priority for charging, control is passed to block 354.

At block 354, the control unit 12 checks whether the secondary power source 22 is first priority for charging. If the secondary power source 22 is first priority for charging, then control is transferred to block 372 where switch sequence 9 of FIG. 13 can be used to charge the secondary power source 22 while it is first priority for charging. After charging for a time period t as determined by block 50, regardless of whether the secondary power source 22 receives sufficient charging, or when the secondary power source 22 is no longer first priority for charging, control is passed to block 28 of FIG. 3. If the secondary power source 22 is not first priority for charging, control is transferred to block 356.

At block 356, the control unit 12 checks whether the tertiary power source 24 is first priority for charging. If the tertiary power source 24 is first priority for charging, then control is transferred to block 374 where switch sequence 11 of FIG. 13 can be used to charge the tertiary power source 24 while it is first priority for charging. After charging for a time period t as determined by block 50, regardless of whether the tertiary power source 24 receives sufficient charging, or when the tertiary power source 24 is no longer first priority for charging, control is passed to block 28 of FIG. 3. If the tertiary power source 24 is not first priority for charging, control is transferred to block 358.

At block 358, the control unit 12 checks whether the primary power source 20 is second priority for charging. If the primary power source 20 is second priority for charging, then control is transferred to block 376 where switch sequence 8 of FIG. 13 can be used to charge the primary power source 20 while it is second priority for charging. When the primary power source 20 is no longer second priority for charging, control is transferred back to block 28 of FIG. 3. After charging for a time period t as determined by block 50, regardless of whether the primary power source 20 receives sufficient charging, control is passed to block 28 of FIG. 3. If the primary power source 20 is not second priority for charging, then control is transferred to block 360.

At block 360, the control unit 12 checks whether the secondary power source 22 is second priority for charging. If the secondary power source 22 is second priority for charging, then control is transferred to block 378 where switch sequence 9 of FIG. 13 can be used to charge the secondary power source 22 while it is second priority for charging. When the secondary power source 22 is no longer second priority for charging, control is transferred back to block 28 of FIG. 3. After charging for a time period t as determined by block 50, regardless of whether the secondary power source 22 receives sufficient charging, control is passed to block 28 of FIG. 3. If the secondary power source 22 is not second priority for charging, then control is transferred to block 362.

At block 362, the control unit 12 checks whether the tertiary power source 24 is second priority for charging. If the tertiary power source 24 is second priority for charging, then control is transferred to block 380 where switch sequence 11 of FIG. 13 can be used to charge the tertiary power source 24 while it is second priority for charging. When the tertiary power source 24 is no longer second priority for charging, control is transferred back to block 28 of FIG. 3. After charging for a time period t as determined by block 50, regardless of whether the tertiary power source 24 receives sufficient charging, control is passed to block 28 of FIG. 3. If the tertiary power source 24 is not second priority for charging, then control is transferred to block 364 where the trickle charge routine (described below with reference to FIG. 10) is executed after which control is transferred to block 28 of FIG. 3.

Additional charging priorities and charging routines can be added to the exemplary control flow diagram in FIG. 9 depending on the various power/storage unit characteristics available to the system.

Figure 10:
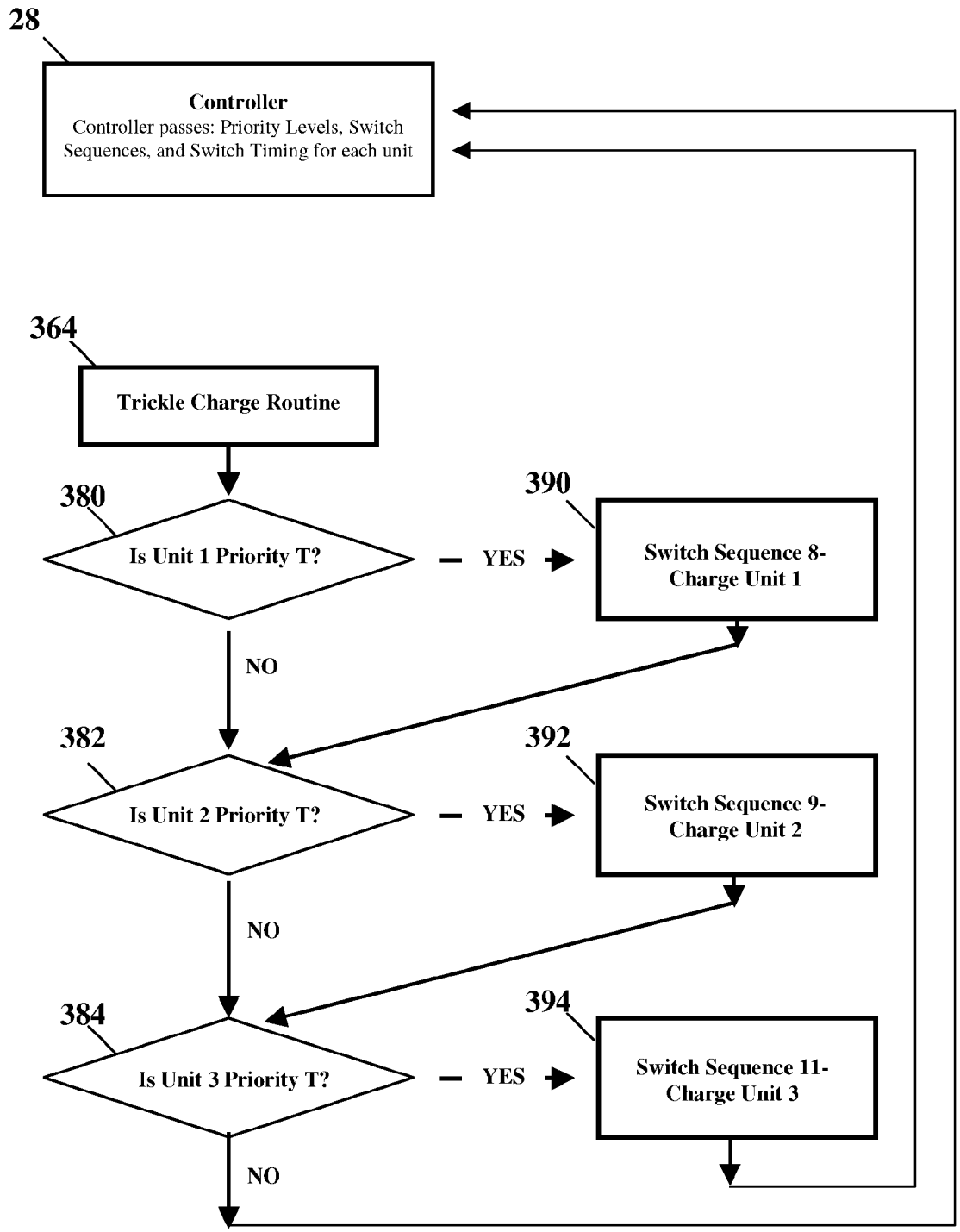
FIG. 10 illustrates an exemplary embodiment of the control method for a trickle charge routine for a three power source system embodiment.

FIG. 10 illustrates an exemplary flow diagram for the trickle charge routine that can be used by the control circuit 12 for a three power unit system, such as the embodiment illustrated in FIG. 2 with an exemplary switch sequence illustrated in FIG. 13. The trickle charge routine illustrated in the exemplary flow diagram of FIG. 10 starts at block 380.

At block 380, the control unit 12 checks whether the primary power source 20 has priority T indicating trickle charge. If the primary power source 20 does not have priority T, then control is transferred to block 382. If the primary power source 20 has priority T, then control is transferred to block 390 where switch sequence 8 of FIG. 13 can be used to charge the primary power source 20. After the predetermined time t as determined by block 50, control is transferred to block 382.

At block 382, the control unit 12 checks whether the secondary power source 22 has priority T indicating trickle charge. If the secondary power source 22 does not have priority T, then control is transferred to block 384. If the secondary power source 22 has priority T, then control is transferred to block 392 where switch sequence 9 of FIG. 13 can be used to charge the secondary power source 22. After the predetermined time t as determined by block 50, control is transferred to block 384.

At block 384, the control unit 12 checks whether the tertiary power source 24 has priority T indicating trickle charge. If the tertiary power source 24 does not have priority T, then control is transferred to block 28 of FIG. 3. If the tertiary power source 24 has priority T, then control is transferred to block 394 where switch sequence 11 of FIG. 13 can be used to charge the tertiary power source 24. After the predetermined time t as determined by block 50, control is transferred to block 28 of FIG. 3.

Figure 11:
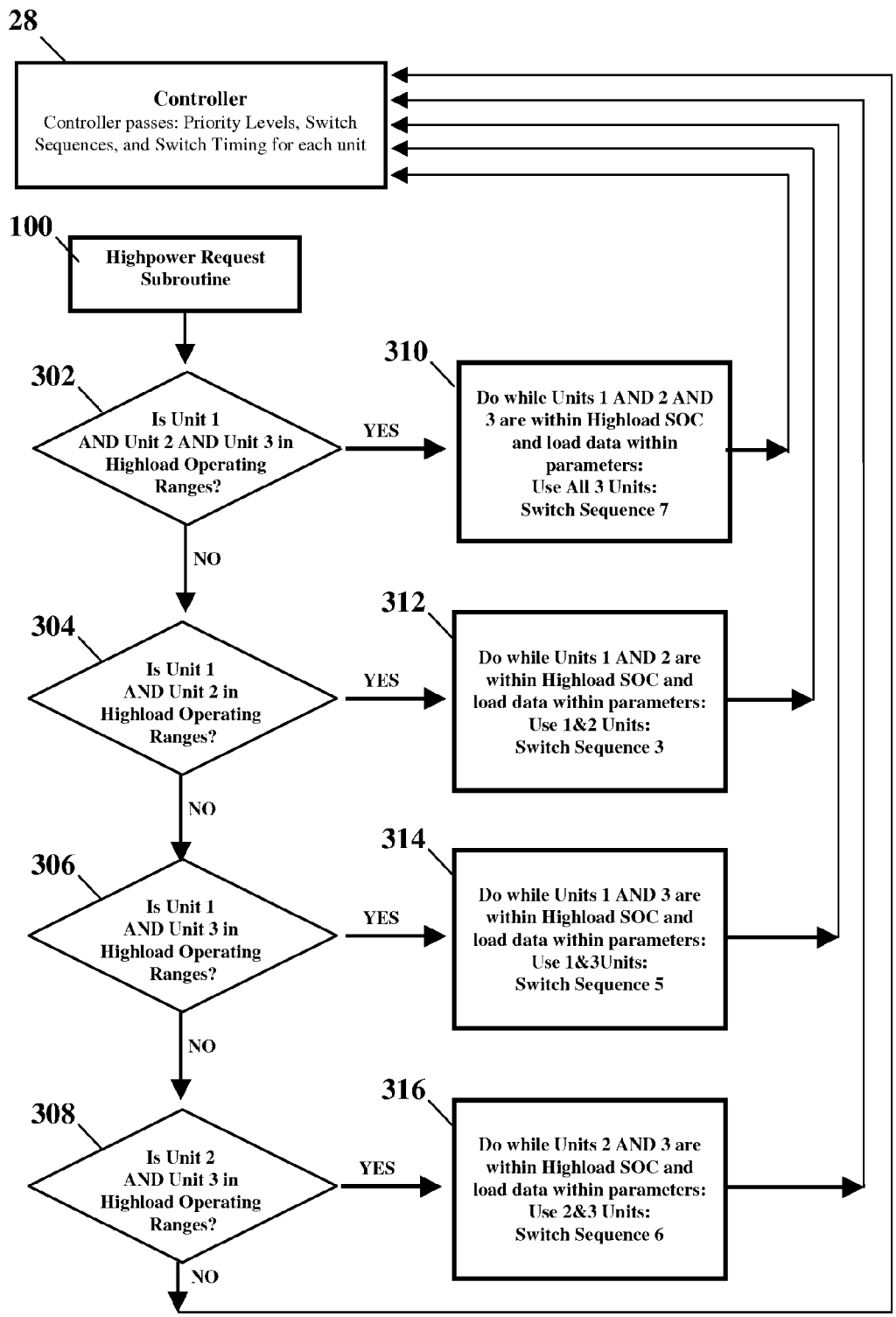
FIG. 11 illustrates an exemplary embodiment of the control method for using a combination of any of the three power units of a three power source system embodiment.

FIG. 11 illustrates an exemplary flow diagram for the highpower routine that can be used by the control circuit 12 for a three power source system, such as the embodiment illustrated in FIG. 2 with an exemplary switch sequence illustrated in FIG. 13. The highpower routine illustrated in the exemplary flow diagram of FIG. 11 starts at block 302.

At block 302, the control unit 12 checks whether all three of the power sources 20, 22 and 24 are within the highpower operating range. If all three power sources 20, 22 and 24 are within the highpower operating range, control is passed to block 310. If any of power sources 20, 22 and 24 are not within the highpower operating range, control is passed to block 304.

At block 310, switch sequence 7 of FIG. 13 can be used to transfer power from all three power sources 20, 22 and 24 to the load 26 while all three power sources 20, 22 and 24 are within the highpower SOC, and the load data is within parameters, and for up to a predetermined time t as determined by block 100, after which control is passed to block 28 of FIG. 3.

At block 304, the control unit 12 checks whether both the primary power source 20 and the secondary power source 22 are within the highpower operating range. If both power sources 20 and 22 are within the highpower operating range, control is passed to block 312. If either of power sources 20, 22 are not within the highpower operating range, control is passed to block 306.

At block 312, switch sequence 3 of FIG. 8 can be used to transfer power from both the primary power source 20 and the secondary power source 22 to the load 26 while both power sources 20, 22 are within the highpower SOC, and the load data is within parameters. After the highpower request ends, or after a predetermined time t as determined by block 100, or when either power source 20, 22 falls outside the highpower SOC, or when the load data falls outside parameters, control is passed to block 28 of FIG. 3.

At block 306, the control unit 12 checks whether both the primary power source 20 and the tertiary power source 24 are within the highpower operating range. If both power sources 20 and 24 are within the highpower operating range, control is passed to block 314. If either of power sources 20, 24 are not within the highpower operating range, control is passed to block 308.

At block 314, switch sequence 5 of FIG. 13 can be used to transfer power from both the primary power source 20 and the tertiary power source 24 to the load 26 while both power sources 20, 24 are within the highpower SOC, and the load data is within parameters. After the highpower request ends, or after a predetermined time t as determined by block 100, or when either power source 20, 24 falls outside the highpower SOC, or when the load data falls outside parameters, control is passed to block 28 of FIG. 3.

At block 308, the control unit 12 checks whether both the secondary power source 22 and the tertiary power source 24 are within the highpower operating range. If both power sources 22 and 24 are within the highpower operating range, control is passed to block 316. If either of power sources 22, 24 are not within the highpower operating range, control is passed to block 28 of FIG. 3.

At block 316, switch sequence 6 of FIG. 13 can be used to transfer power from both the secondary power source 22 and the tertiary power source 24 to the load 26 while both power sources 22, 24 are within the highpower SOC, and the load data is within parameters. After the highpower request ends, or after a predetermined time t as determined by block 100, or when either power source 22, 24 falls outside the highpower SOC, or when the load data falls outside parameters, control is passed to block 28 of FIG. 3.

Figure 12:
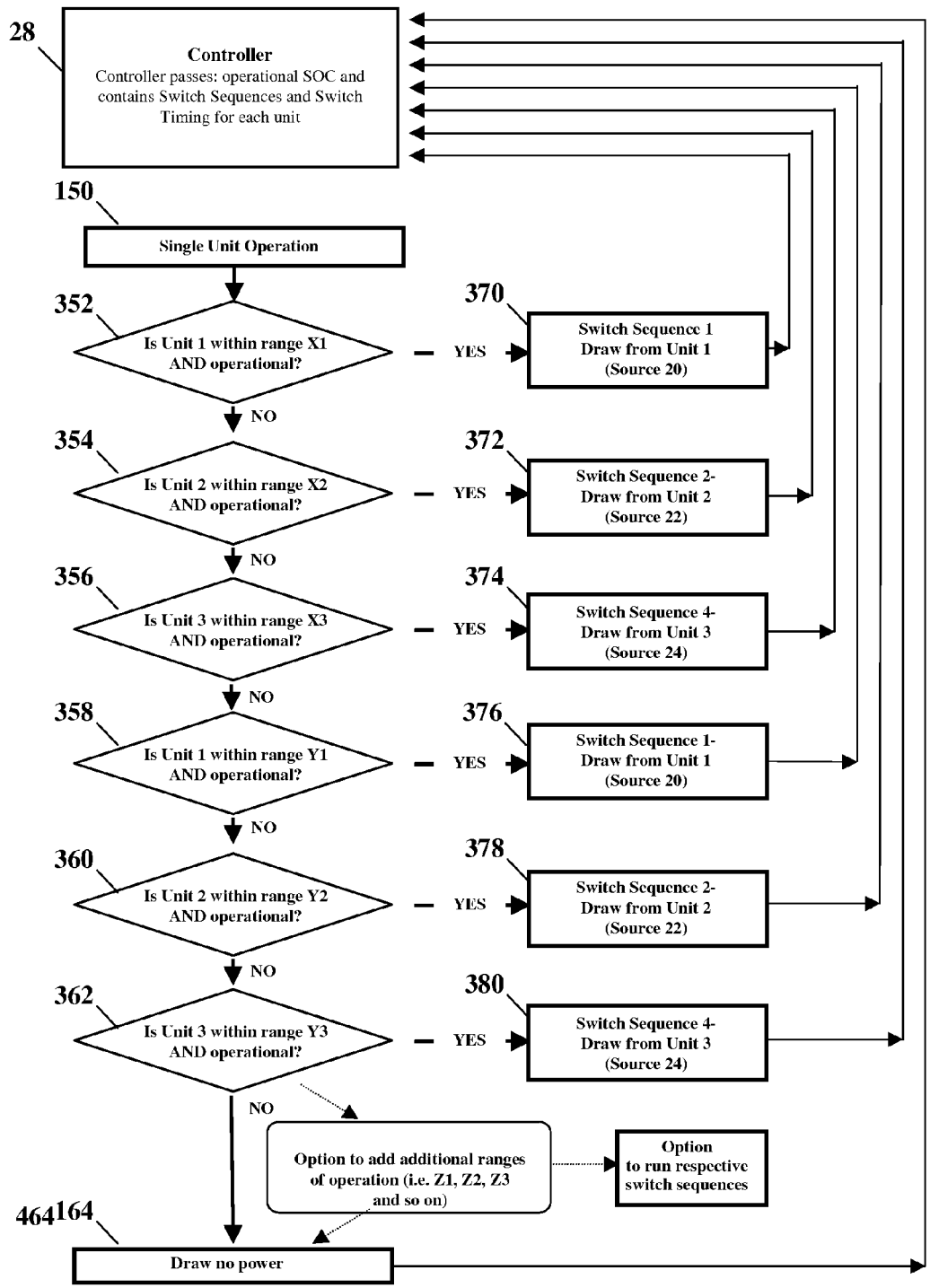
FIG. 12 illustrates an exemplary embodiment of the control method for a power routine using a single power source of a three power source system embodiment.

FIG. 12 shows an exemplary embodiment of a flow diagram for the power routine 150 that can be used by the control unit 12 for a three power source system, such as the embodiment illustrated in FIG. 2 with an exemplary switch sequence illustrated in FIG. 13. The power routine is called from FIG. 3, and starts at block 352 in FIG. 12.

At block 352, the control unit 12 checks if the primary power source 20 is within range X1 and is operational. The range X1 is the desired range for the state of charge (SOC) of the primary power source 20. If the primary power source is within range X1 and is operational, then control is transferred to block 370 where switch sequence 1 of FIG. 13 can be used to draw power from the primary power source 20 for time period t as determined by block 150, after which control is transferred back to block 28 of FIG. 3. If the primary power source 20 is not within range X1 or is not operational, then control is transferred to block 354.

At block 354, the control unit 12 checks if the secondary power source 22 is within range X2 and is operational. The range X2 is the desired range for the state of charge of the secondary power source 22. If the secondary power source 22 is within range X2 and is operational, then control is transferred to block 372 where switch sequence 2 of FIG. 13 can be used to draw power from the secondary power source 22 for time period t as determined by block 150, after which control is transferred back to block 28 of FIG. 3. If the secondary power source 22 is not within range X2 or is not operational, then control is transferred to block 356.

At block 356, the control unit 12 checks if the tertiary power source 24 is within range X3 and is operational. The range X3 is the desired range for the state of charge of the tertiary power source 24. If the tertiary power source 24 is within range X3 and is operational, then control is transferred to block 374 where switch sequence 4 of FIG. 13 can be used to draw power from the tertiary power source 24 for time period t as determined by block 150, after which control is transferred back to block 28 of FIG. 3. If the tertiary power source 24 is not within range X2 or is not operational, then control is transferred to block 358.

At block 358, the control unit 12 checks if the primary power source 20 is within range Y1 and is operational. The range Y1 is a broader acceptable range for the state of charge of the primary power source 20. If the primary power source 20 is within range Y1 and is operational, then control is transferred to block 376 where switch sequence 1 of FIG. 13 can be used to draw power from the primary power source 20 for time period t as determined by block 150, after which control is transferred back to block 28 of FIG. 3. If the primary power source is not within range Y1 or is not operational, then control is transferred to block 360.

At block 360, the control unit 12 checks if the secondary power source 22 is within range Y2 and is operational. The range Y2 is a broader acceptable range for the state of charge of the secondary power source 22. If the secondary power source 22 is within range Y2 and is operational, then control is transferred to block 378 where switch sequence 2 of FIG. 13 can be used to draw power from the secondary power source 22 for time period t as determined by block 150, after which control is transferred back to block 28 of FIG. 3. If the secondary power source 22 is not within range Y2 or is not operational, then control is transferred to block 362.

At block 362, the control unit 12 checks if the tertiary power source 24 is within range Y3 and is operational. The range Y3 is a broader acceptable range for the state of charge of the tertiary power source 24. If the tertiary power source 24 is within range Y3 and is operational, then control is transferred to block 380 where switch sequence 4 of FIG. 13 can be used to draw power from the tertiary power source 24 for time period t as determined by block 150, after which control is transferred back to block 28 of FIG. 3. If the tertiary power source 24 is not within range Y3 or is not operational, then control is transferred to block 464 where no power is drawn from the primary, secondary or tertiary power sources 20, 22, 24 after which control is transferred to block 28 of FIG. 3. In alternative embodiments, additional operating ranges can be inserted between block 362 and block 464.

While exemplary embodiments incorporating the principles of the present invention have been disclosed hereinabove, the present invention is not limited to the disclosed embodiments. Instead, this application is intended to cover any variations, uses, or adaptations of the invention using its general principles. Further, this application is intended to cover such departures from the present disclosure as come within known or customary practice in the art to which this invention pertains.

We claim:

1. A method for transferring energy to and from a load using an energy transfer circuit comprising a first capacitor, a second capacitor, an inductor, a first switch between the inductor and the first capacitor, a second switch between the inductor and the second capacitor, and a control unit, the method comprising:

connecting the load in parallel with the first capacitor of the energy transfer circuit;

connecting a primary energy source having a first voltage in parallel with the first capacitor of the energy transfer circuit;

connecting a secondary energy source having a second voltage in parallel with the second capacitor of the energy transfer circuit;

communicating status information from the primary energy source to the control unit;

communicating status information from the secondary energy source to the control unit;
communicating energy requests from the load to the control unit;
controlling the opening and closing of the first switch and the second switch using the control unit;
responding to charging currents from the load;
responding to power demands from the load;
responding to energy requests for the primary energy source and the secondary energy source; and
keeping the first switch and the second switch open unless responding to the charging currents, power demands or energy requests from the load, the primary energy source or the secondary energy source;
wherein responding to charging currents from the load comprises:
  determining whether either of the primary energy source or the secondary energy source has a charge priority;
  charging the primary energy source when the primary energy source has the highest charge priority;
  charging the secondary energy source when the secondary energy source has the highest charge priority;
  running a trickle charge routine when neither of the primary energy source or the secondary energy source has the charge priority;
  discontinuing the response to the charging current from the load when the charging current ceases; and
  discontinuing the response to the charging current from the load after a limited time.

2. The method of claim 1, wherein charging the primary energy source comprises:
  keeping the first and second switches open to charge the primary energy source with power from the load.

3. The method of claim 1, wherein the energy transfer circuit further comprises a second diode in parallel with the second switch, the second diode biased to conduct current from the inductor towards the second capacitor, and charging the secondary energy source comprises:
  closing the first switch and keeping the second switch open to charge the inductor with power from the load;
  then opening the first switch and discharging the inductor through the second diode to charge the secondary energy source;
  then repeating these steps at a desired frequency to charge the secondary energy source.

4. The method of claim 3, wherein charging the secondary energy source further comprises the following steps to be repeated as part of the repeating step:
  closing the second switch after opening the first switch and discharging the inductor through the second switch to charge the secondary energy source;
  then opening the second switch and continuing to discharge the inductor through the second diode to charge the secondary energy source.

5. A method for transferring energy to and from a load using an energy transfer circuit comprising a first capacitor, a second capacitor, an inductor, a first switch between the inductor and the first capacitor, a second switch between the inductor and the second capacitor, and a control unit, the method comprising:
  connecting the load in parallel with the first capacitor of the energy transfer circuit;
  connecting a primary energy source having a first voltage in parallel with the first capacitor of the energy transfer circuit;
  connecting a secondary energy source having a second voltage in parallel with the second capacitor of the energy transfer circuit;
  closing the first switch to put the primary energy source in parallel with the inductor and to transfer energy between the primary energy source and the inductor;
  closing the second switch to put the secondary energy source in parallel with the inductor and to transfer energy between the secondary energy source and the inductor;
  communicating status information from the primary energy source to the control unit;
  communicating status information from the secondary energy source to the control unit;
  communicating energy requests from the load to the control unit;
  controlling the opening and closing of the first switch and the second switch using the control unit;
  responding to charging currents from the load;
  responding to power demands from the load;
  responding to energy requests for the primary energy source and the secondary energy source; and
  keeping the first switch and the second switch open unless responding to the charging currents, power demands or energy requests from the load, the primary energy source or the secondary energy source;
  wherein responding to power demands from the load comprises:
    determining whether the power demand is a multiple source power demand or a single source power demand;
    executing a highpower routine when the power demand is the multiple source power demand; and
    executing a single unit power routine when the power demand is the single source power demand; and
  wherein executing a highpower routine comprises:
    determining whether the primary energy source is in a primary highload operating range;
    determining whether the secondary energy source is in a secondary highload operating range;
    transferring power from both the primary and secondary energy sources to the load when the primary energy source is in the primary highload operating range and the secondary energy source is in the secondary highload operating range;
    monitoring the state of charge of the primary and secondary energy sources;
    discontinuing the highpower routine when the primary energy source goes outside the primary highload operating range;
    discontinuing the highpower routine when the secondary energy source goes outside the secondary highload operating range;
    discontinuing the highpower routine when the power demand ceases; and
    discontinuing the highpower routine after a limited time.

6. The method of claim 5, wherein the energy transfer circuit further comprises a first diode in parallel with the first switch, the first diode biased to conduct current from the inductor towards the first capacitor, a second diode in parallel with the second switch, the second diode biased to conduct current from the inductor towards the second capacitor; and transferring power from both the primary and secondary energy sources to the load comprises:
  providing power to the load from the primary energy source regardless of the positions of the first and second switches;

closing the second switch and keeping the first switch open to charge the inductor with power from the secondary energy source;

opening the second switch and discharging the inductor through the first diode to charge the load;

closing the first switch after opening the second switch and discharging the inductor through the first switch to charge the load;

opening the first switch and continuing to discharge the inductor through the first diode to charge the load; and repeating these four steps at a desired frequency to charge the load.

7. A method for transferring energy to and from a load using an energy transfer circuit comprising a first capacitor, a second capacitor, an inductor, a first switch between the inductor and the first capacitor, a second switch between the inductor and the second capacitor, and a control unit, the method comprising:

connecting the load in parallel with the first capacitor of the energy transfer circuit;

connecting a primary energy source having a first voltage in parallel with the first capacitor of the energy transfer circuit;

connecting a secondary energy source having a second voltage in parallel with the second capacitor of the energy transfer circuit;

closing the first switch to put the primary energy source in parallel with the inductor and to transfer energy between the primary energy source and the inductor;

closing the second switch to put the secondary energy source in parallel with the inductor and to transfer energy between the secondary energy source and the inductor;

communicating status information from the primary energy source to the control unit;

communicating status information from the secondary energy source to the control unit;

communicating energy requests from the load to the control unit;

controlling the opening and closing of the first switch and the second switch using the control unit;

responding to charging currents from the load;

responding to power demands from the load;

responding to energy requests for the primary energy source and the secondary energy source; and keeping the first switch and the second switch open unless responding to the charging currents, power demands or energy requests from the load, the primary energy source or the secondary energy source;

wherein responding to power demands from the load comprises:

determining whether the power demand is a multiple source power demand or a single source power demand;

executing a highpower routine when the power demand is the multiple source power demand; and executing a single unit power routine when the power demand is the single source power demand; and wherein executing a single unit power routine comprises:

determining an operating condition of the primary energy source;

determining an operating condition of the secondary energy source;

transferring power from the primary energy source to the load when the primary energy source is in as good or better operating condition than the secondary energy source;

transferring power from the secondary energy source to the load when the secondary energy source is in better operating condition than the primary energy source;

discontinuing the single unit power routine when the power demand ceases; and discontinuing the single unit power routine after a limited time.

8. The method of claim 7, wherein the energy transfer circuit further comprises a first diode in parallel with the first switch, the first diode biased to conduct current from the inductor towards the first capacitor, a second diode in parallel with the second switch, the second diode biased to conduct current from the inductor towards the second capacitor; and transferring power from the secondary energy source to the load comprises:

closing the second switch and keeping the first switch open to charge the inductor with power from the secondary energy source;

opening the second switch and discharging the inductor through the first diode to power the load;

closing the first switch after opening the second switch and discharging the inductor through the first switch to power the load;

opening the first switch and continuing to discharge the inductor through the first diode to power the load; and repeating these four steps at a desired frequency to charge the load.

* * * * *